US008474848B2

(12) United States Patent
Bernatsky et al.

(10) Patent No.: US 8,474,848 B2
(45) Date of Patent: Jul. 2, 2013

(54) PERSONAL MOBILITY VEHICLE WITH TILTABLE SEAT

(75) Inventors: Todd Bernatsky, Lafayette, CO (US); Philip Schreiber, Denver, CO (US); Thomas J. Whelan, Longmont, CO (US); Wayne Hanson, Bozeman, MT (US); Steven L. Lindquist, Broomfield, CO (US); Jerry Houtart, Longmont, CO (US); Richard Schneider, Loveland, CO (US); Allen B. Killebrew, Erie, CO (US); Mike Nordquist, Longmont, CO (US)

(73) Assignee: Sunrise Medical (US) LLC, Fresno, CA (US)

( * ) Notice: Subject to any disclaimer, the term of this patent is extended or adjusted under 35 U.S.C. 154(b) by 1219 days.

(21) Appl. No.: 10/913,005

(22) Filed: Aug. 6, 2004

(65) Prior Publication Data

US 2005/0116440 A1 Jun. 2, 2005

Related U.S. Application Data

(63) Continuation-in-part of application No. 10/403,998, filed on Mar. 31, 2003.

(51) Int. Cl.
*B62M 1/14* (2006.01)

(52) U.S. Cl.
USPC .................................... 280/250.1; 280/304.1

(58) Field of Classification Search
USPC ........................................... 280/304.1, 250.1
See application file for complete search history.

(56) References Cited

U.S. PATENT DOCUMENTS

| | | | | |
|---|---|---|---|---|
| 278,732 | A | 6/1883 | Porter et al. | |
| 672,842 | A | 4/1901 | Porter et al. | |
| 838,228 | A | 12/1906 | Williams | |
| 2,195,428 | A * | 4/1940 | Searing | 114/194 |
| 2,313,023 | A | 3/1943 | Ruegger | |

(Continued)

FOREIGN PATENT DOCUMENTS

| | | |
|---|---|---|
| DE | 3805630 | 2/1988 |
| DE | 10109233 C1 | 8/2002 |

(Continued)

OTHER PUBLICATIONS

Brochure of the Bug, published by Plainsense, Oct. 2002.

(Continued)

*Primary Examiner* — Tashiana Adams
*Assistant Examiner* — Marlon Arce
(74) *Attorney, Agent, or Firm* — MacMillan, Sobanski & Todd, LLC

(57) ABSTRACT

The vehicle comprises a base and a seat moveable along a curve having a focal point. The vehicle is adjustable to position an occupant in the seat to achieve a desired position for the center of gravity of the occupant relative to the focal point of the curve. A method for minimizing effort required to tilt the seat of a personal mobility vehicle comprises the steps of providing a personal mobility vehicle having a seat that is adapted to move along an arc having a center of curvature, positioning the seat substantially horizontally, providing an occupant in the seat, and adjusting the position of the vehicle occupant's center of gravity so that the center of gravity is substantially equal to or below the center of curvature of the arc.

34 Claims, 18 Drawing Sheets

U.S. PATENT DOCUMENTS

| | | | | |
|---|---|---|---|---|
| 2,770,286 | A | 11/1956 | Weller | |
| 2,874,689 | A | 2/1959 | Gavelek | |
| 3,632,076 | A | 1/1972 | Rogers, Jr. | |
| 3,999,799 | A | 12/1976 | Daswick | |
| 4,462,604 | A * | 7/1984 | Meyer | 280/250.1 |
| 4,515,337 | A * | 5/1985 | Torras | 248/371 |
| 4,566,551 | A | 1/1986 | Feliz | |
| 4,592,570 | A * | 6/1986 | Nassiri | 280/650 |
| 4,679,816 | A * | 7/1987 | Riikonen | 280/650 |
| 4,709,960 | A | 12/1987 | Launes | |
| 4,759,561 | A | 7/1988 | Janssen | |
| 4,842,232 | A | 6/1989 | Pipon et al. | |
| 4,893,827 | A * | 1/1990 | Gay et al. | 280/250.1 |
| 4,941,709 | A | 7/1990 | Moller | |
| 4,957,302 | A | 9/1990 | Maxwell | |
| 5,249,838 | A | 10/1993 | Kulpa et al. | |
| 5,267,745 | A * | 12/1993 | Robertson et al. | 280/250.1 |
| 5,320,373 | A * | 6/1994 | Robertson et al. | 280/250.1 |
| 5,360,224 | A * | 11/1994 | Geiger et al. | 280/250.1 |
| 5,409,247 | A * | 4/1995 | Robertson et al. | 280/250.1 |
| 5,458,349 | A | 10/1995 | Mung-Tung | |
| 5,624,159 | A | 4/1997 | Celoni et al. | |
| 5,669,324 | A | 9/1997 | Muir, III | |
| 5,967,609 | A | 10/1999 | Potter | |
| 5,971,482 | A | 10/1999 | Goertzen et al. | |
| 6,003,891 | A | 12/1999 | Broadhead | |
| 6,012,774 | A | 1/2000 | Potter | |
| 6,050,642 | A | 4/2000 | Erb | |
| 6,056,363 | A | 5/2000 | Maddox | |
| 6,106,065 | A | 8/2000 | Carroll | |
| 6,126,186 | A | 10/2000 | Mascari | |
| 6,203,106 | B1 | 3/2001 | Nearing et al. | |
| 6,206,393 | B1 | 3/2001 | Mascari et al. | |
| 6,270,111 | B1 | 8/2001 | Hanson et al. | |
| 6,276,704 | B1 | 8/2001 | Suiter | |
| 6,357,776 | B1 | 3/2002 | Goertzen et al. | |
| 6,382,725 | B1 | 5/2002 | Carroll | |
| 6,409,265 | B1 | 6/2002 | Koerlin et al. | |
| 6,425,635 | B1 | 7/2002 | Pulver | |
| 6,505,365 | B1 | 1/2003 | Hanson et al. | |
| 6,505,480 | B2 | 1/2003 | Tsuboe et al. | |
| 6,516,480 | B2 | 2/2003 | Elliott | |
| 2001/0002081 | A1 * | 5/2001 | Toppses | 280/250.1 |
| 2001/0011805 | A1 * | 8/2001 | Kueschall | 280/250.1 |

FOREIGN PATENT DOCUMENTS

| | | | |
|---|---|---|---|
| EP | 0 405 542 | | 6/1990 |
| EP | 0405542 | A2 | 6/1990 |
| GB | 2119639 | A1 | 11/1983 |
| GB | 2216405 | | 3/1989 |
| JP | 2002065752 | | 9/2000 |
| WO | WO 2004/021834 | A1 | 3/2004 |

OTHER PUBLICATIONS

Webpage describing the Rx Rocker, and published by Abledata, May 11, 2005.

Webpage of the Rx Rocker, published by Rx Rocker, Dec. 1, 2004.

* cited by examiner

PERSONAL MOBILITY VEHICLE WITH TILTABLE SEAT

CROSS-REFERENCE TO RELATED APPLICATIONS

This application is a continuation-in-part of U.S. patent application Ser. No. 10/403,998, filed Mar. 31, 2003, which is incorporated herein by reference.

BACKGROUND OF INVENTION

This invention relates generally to land vehicles and more particularly to personal mobility vehicles. Most particularly, the invention relates to a personal mobility vehicle having a tiltable seat assembly.

Personal mobility vehicles with tilting seats are well known. Such vehicles are typically used in highly dependent or geriatric care, wherein the ability to reposition a vehicle occupant in various angular positions is beneficial to the occupant's health and daily routine. Tilting a vehicle occupant relieves pressure to the vehicle occupant's ischial tuberosities (i.e., the bony prominence of the buttocks). Continuous pressure to the vehicle occupant's ischial tuberosities, which is applied when the vehicle occupant remains in a single seated position, can cause the development of decubitus ulcers (i.e., pressure sores). For vehicle occupants with severe kyphosis (i.e., curvature of the spine), seated tilting may allow the occupant to look forward and interact with their surroundings. Tilting may also be beneficial to assist with proper respiration and digestion.

Some personal motor vehicle occupants require attendant care, wherein an attendant is responsible for positioning the vehicle seat angle, often changing the angle on a prescribed schedule. The ability to tilt the vehicle occupant offers the occupant a variety of positions that accommodate their daily schedule, including, for example, an anterior tilt for eating at a table and posterior tilt for resting.

Conventional tilting personal mobility vehicles consist of a seat frame that is pivotally mounted to a base frame so that the seat frame tilts to reposition the vehicle occupant. The pivot axis is typically mounted between the base frame and seat frame, towards the rear of the seat and away from the occupant's center of gravity. Tilting the occupant involves lifting or lowering his or her center of gravity and therefore requires effort on the part of the attendant. Mechanisms, such as springs or gas cylinders, are often employed to assist in tilting the occupant. Typically, levers are attached to handles on a seat-tilting vehicle. The levers allow an attendant to release a locking mechanism, change the tilt angle by pushing or pulling on the handles, and engage the locking mechanism, which fixes the tilt angle.

Tilting the seat in conventional tilt personal motor vehicles may invoke a reaction on the part of the occupant who experiences the sensation of being tipped over. The occupant experiences a sensation of being pitched off balance during tilting. Conventional tilt seat designs involve translation of the vehicle occupant's center of gravity during tilting. Significant effort on the part of the attendant may be required to tilt the vehicle occupant when the occupant's mass translates during tilting. Moreover, conventional vehicles with tilt seats require large base frames and anti-tip devices because tilting the chair displaces the occupant's center of gravity fore and aft over the wheelbase, potentially placing the vehicle off balance.

What is needed is a personal mobility vehicle that does not evoke the sensation of being tipped over; that requires minimal effort on the part of the attendant to tilt (i.e., no lifting or lowering of the vehicle occupant's center of gravity should be required to tilt the vehicle seat assembly); does not affect weight distribution between the front and rear wheels; and that is limited to pure rotation (i.e., the only effort required is to overcome friction within the system), thus eliminating the need for springs or gas cylinders to assist tilting.

SUMMARY OF INVENTION

The present invention is directed towards a personal mobility vehicle that overcomes the foregoing deficiencies. The vehicle comprises a base and a seat moveable along a curve having a focal point. The vehicle is adjustable to position an occupant in the seat to achieve a desired position for the center of gravity of the occupant relative to the focal point of the curve.

Another embodiment of the invention is directed to a personal mobility vehicle comprising a personal mobility vehicle having a seat that is supported for movement relative to a radial or quasi radial curve having a center of curvature that is preferably substantially fixed in space. The seat is adjustable with respect to the curve so that the center of gravity of a vehicle occupant is sufficiently coincident with the focal point of the curve so that force required to tilt the seat is minimized.

Another embodiment of the invention is directed to a personal mobility vehicle comprising a base and a seat for support a vehicle occupant. The seat is supported for movement along a curve having a center of curvature. The seat is adapted to support a vehicle occupant having a center of gravity that is adapted to be positioned relative to the center of curvature sufficient to minimize effort required to move the seat with the vehicle occupant therein along the curve.

Another embodiment of the invention is directed to a personal mobility vehicle comprising a base, a plurality of wheels that are adapted to support the base relative to a supporting surface, and a seat for supporting an occupant. The seat is supported relative to the base for movement along an arcuate path with a fixed center of rotation. The seat is adjustable such that the center of gravity of the occupant is adapted to be substantially coincident with the center of rotation.

Another embodiment of the invention is directed to a personal mobility vehicle comprising a base, a plurality of wheels that are adapted to support the base relative to a supporting surface, a seat, one or more tracks having a constant radius arc supporting the seat for movement relative to the base, and a low friction support assembly supported by either the base or the seat or any combination thereof. The support permits an overall tilt angle range of the one or more tracks to be adjusted.

Another embodiment of the invention is directed to a personal mobility vehicle comprising a base, a plurality of wheels that are adapted to support the base relative to a supporting surface, a seat for supporting an occupant, and one or more tracks supporting the seat. The tracks serve as a rolling or sliding surface that allows the seat to rotate with respect to the base. The tracks have a constant or substantially constant radius arc with a focal point that is substantially fixed in space, whereby the location of the center of gravity of the occupant can be adjusted to be coincident or near coincident with the focal point.

Another embodiment of the invention is directed to a method for minimizing effort required to tilt the seat of a personal mobility vehicle. The method comprises the steps of providing a personal mobility vehicle having a seat that is adapted to move along an arc having a center of curvature, positioning the seat substantially horizontally, providing an occupant in the seat, and adjusting the position of the vehicle occupant's center of gravity so that the center of gravity is substantially equal to or below the center of curvature of the arc.

Various objects and advantages of this invention will become apparent to those skilled in the art from the following detailed description of the preferred embodiment, when read in light of the accompanying drawings.

DETAILED DESCRIPTION

Figure 1:
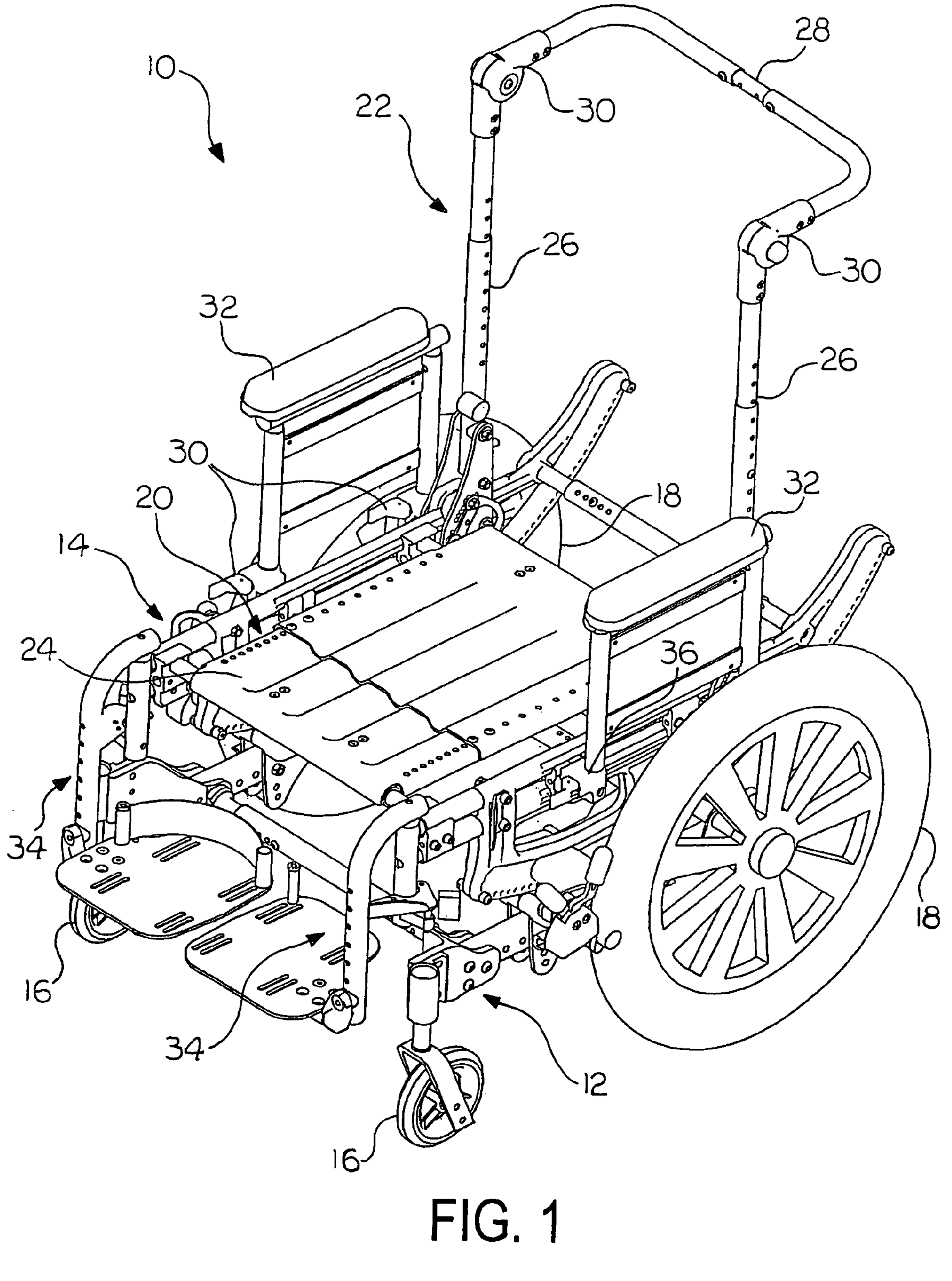
FIG. 1 is a front perspective view of a personal mobility vehicle according to a preferred embodiment of the invention.
Figure 2:
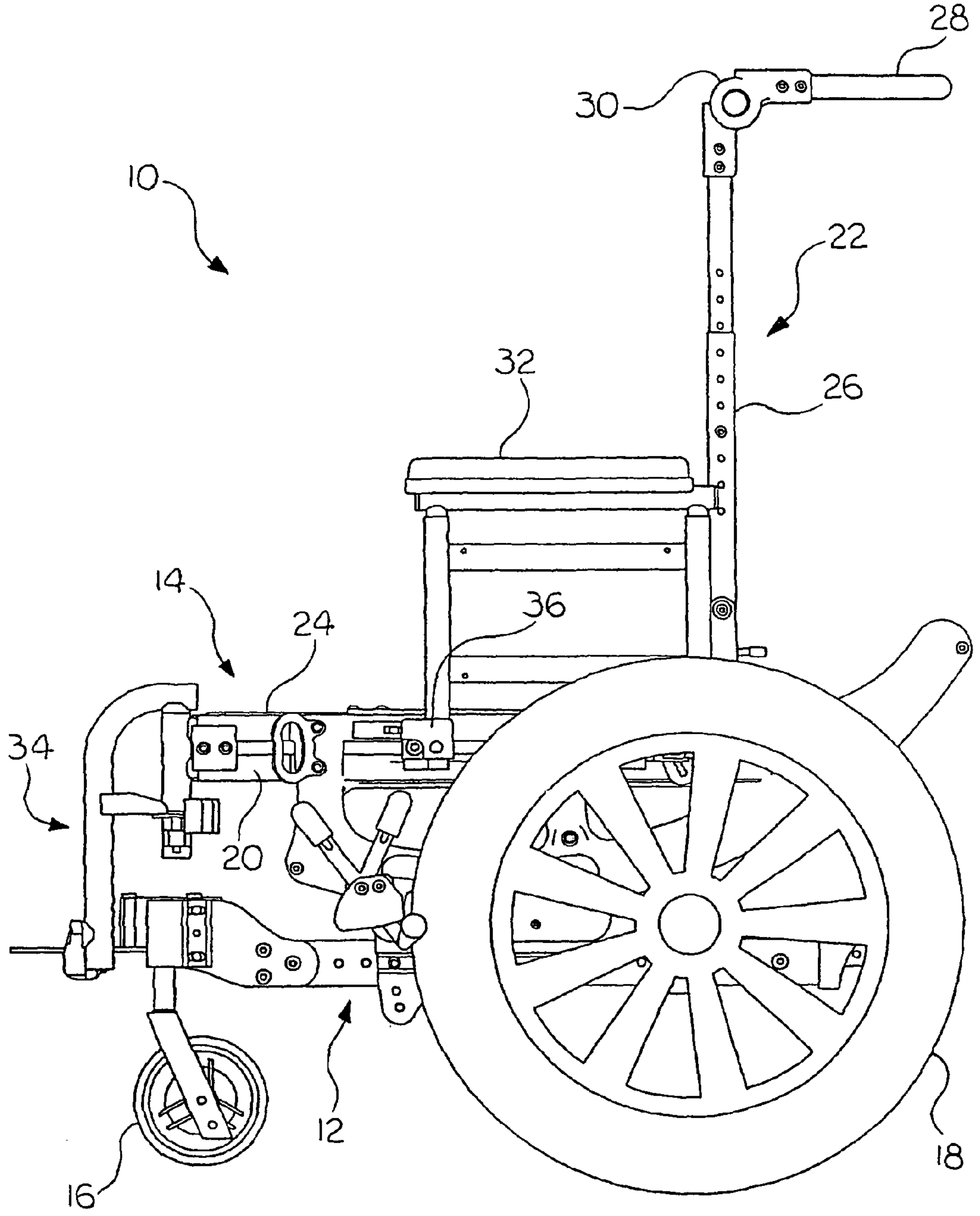
FIG. 2 is a side elevational view of the vehicle shown in FIG. 1.

Referring now to the drawings, there is illustrated in FIGS. 1 and 2 a personal mobility vehicle, as generally indicated at 10. The vehicle 10 has a base 12 and a seat assembly 14 supported by the base 12. The base 12 is supported on a supporting surface by wheels, such as the front casters 16 and the rear wheels 18 shown. The front wheels 16 are preferably casters and the rear wheels 18 are preferably driven wheels, which may be manually driven or power driven. It is noted that the personal motorized vehicle shown is in the form of a wheelchair but the invention is intended to be practiced with other personal mobility vehicles, including but not limited to scooters. Although the wheelchair illustrated is a rear wheel-drive wheelchair, the invention may be practiced with front mid-wheel drive vehicles. The seat assembly 14 has a seat frame 20 and a seat back 22. The seat frame 20 includes longitudinally extending frame members, such as tubes, for supporting a seat 24, which can be in the form of a semi-rigid or rigid pan, as shown, or a resilient or pliable sling (not shown). The seat 24 may include adjustable parts, such as the telescopic parts shown, that are longitudinally adjustable relative to one another to permit the length of the seat 24 to be adjusted. The seat back 22 preferably includes laterally spaced canes 26 for supporting a backrest (not shown). The canes 26 are preferably formed of adjustable parts, such as the telescopic tubes shown, that permit the length of the canes 26, and the seat back 22, to be adjusted. A handle 28 may be supported by the canes 26. In the illustrated embodiment, the handle 28 is pivotally coupled to the canes 26, preferably by couplings 30 that are adapted to releasably hold the handle 28 in a fixed relation to the canes 26.

The seat frame 20 is preferably adapted to support armrests 32 and footrest assemblies 34. The armrests 32 are preferably releasably attached to the seat frame 20 and movable in a longitudinal direction relative to the seat frame 20. The armrests 32 are preferably held in fixed relation to the seat frame 20 in any conventional manner, such as by the tube clamps 36 shown. The footrest assemblies 34 are also releasably and movably attached to the seat frame 20.

Figure 3:
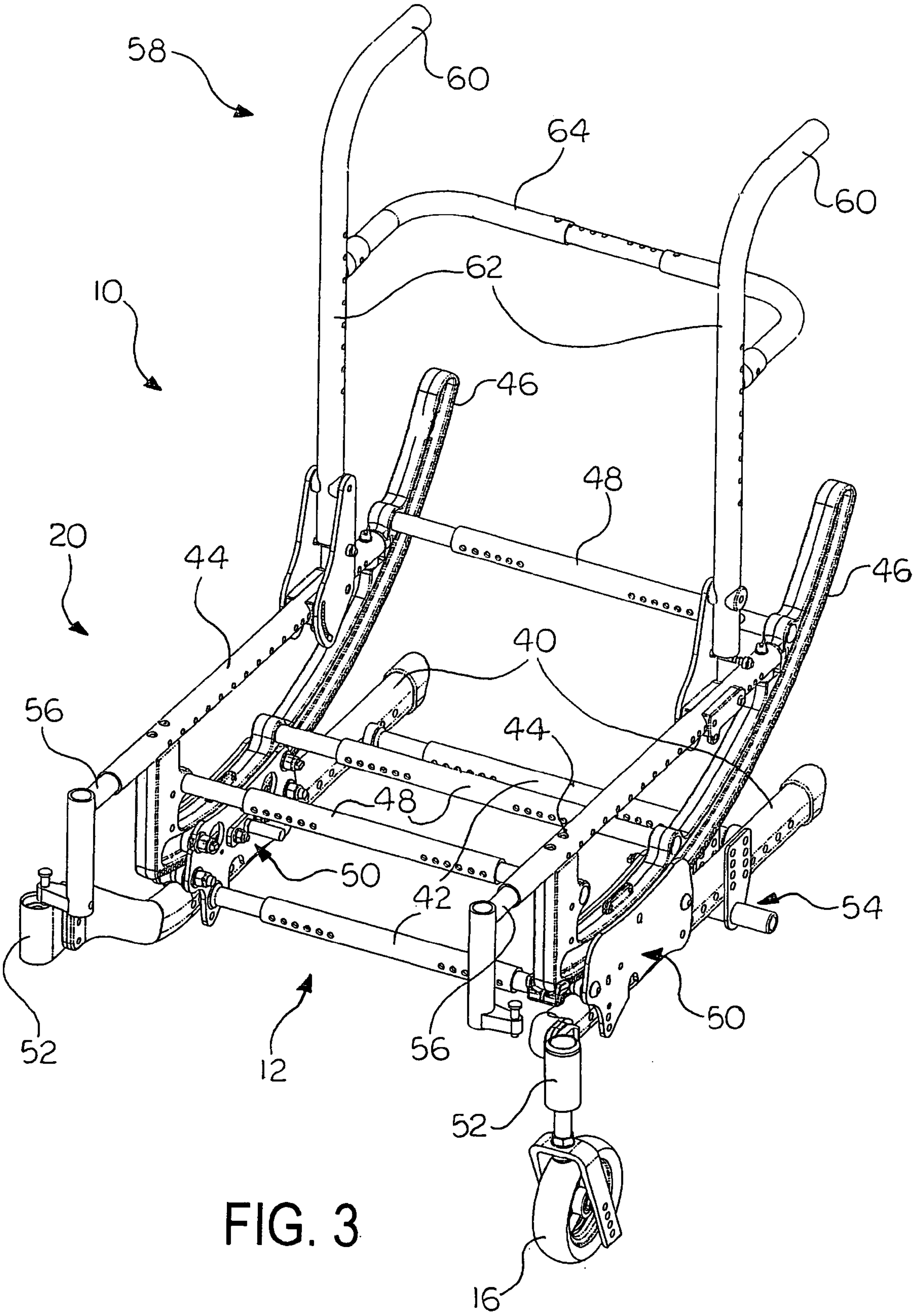
FIG. 3 is a front perspective view of a base frame and a seat frame of the vehicle with an alternative backrest.
Figure 4:
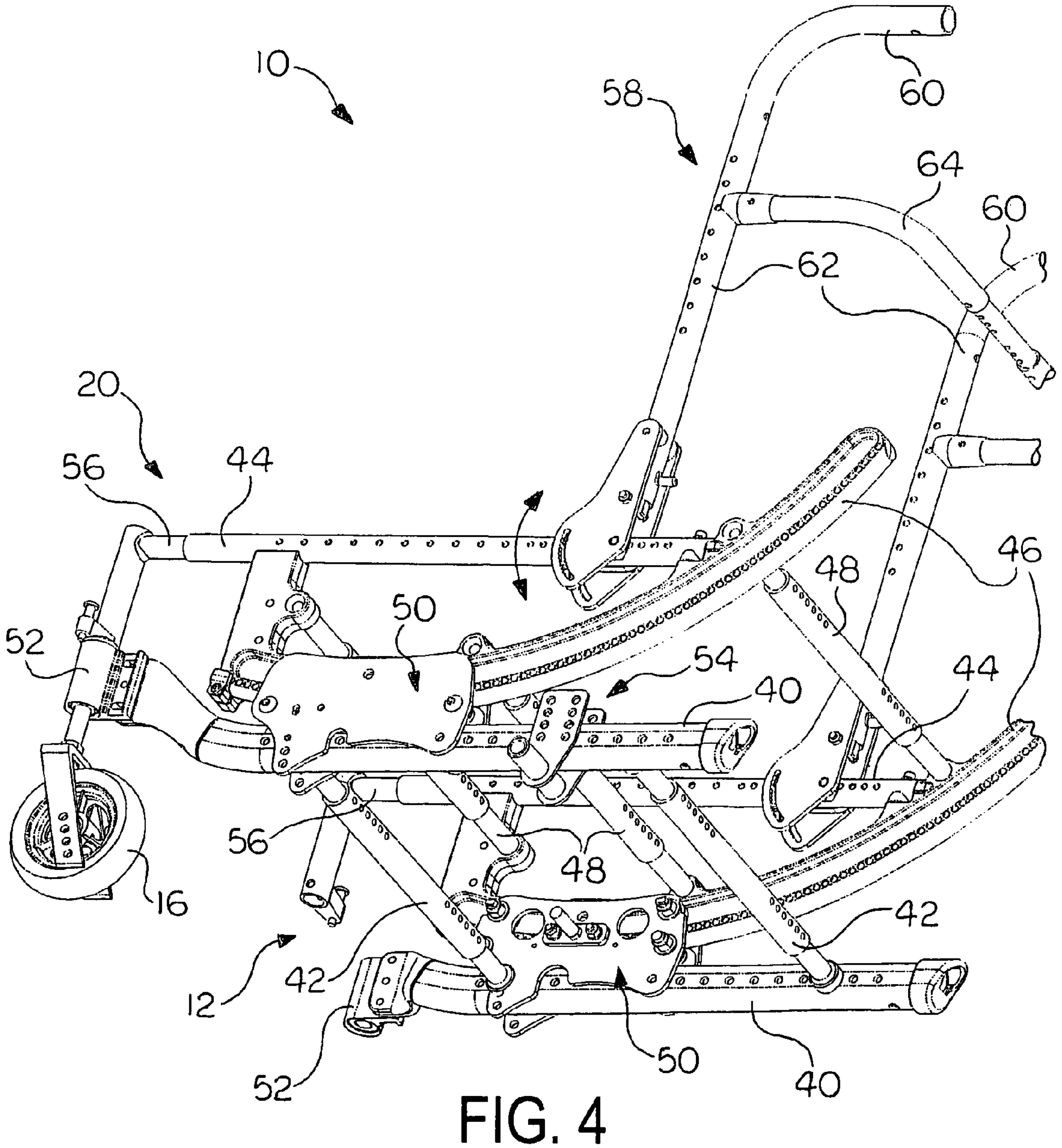
FIG. 4 is a bottom rear perspective view of the base frame and the seat frame shown in FIG. 3.

As illustrated in FIGS. 3 and 4, the base 12 includes a base frame (shown but not referenced), which is comprised of opposing side frame members, such as the tubes 40, joined by a pair of longitudinally spaced, laterally extending frame members, such as the tubes 42 shown. It should be noted that the laterally extending tubes 42 are preferably of telescopic tubes that are adjustable relative to one another to permit the vehicle 10 to grow in width. It should further be noted that the position of the laterally extending tubes 42 is preferably adjusted relative to the side tubes 40, for example, via the longitudinally spaced holes and fasteners (not shown).

The seat frame 20 is similarly comprised of opposing side frame members, such as the tubes 44 shown, and curved or substantially curved members, such as the tracks or rockers

46 shown, or a curved rack (not shown), joined by a plurality of longitudinally spaced, laterally extending members such as the tubes 48 shown. It should be noted that the laterally extending tubes 48 are preferably in the form of telescopic tubes that are adjustable relative to one another to permit the vehicle 10 to grow in width. The seat frame 20 is supported relative to the side tubes 40 by the rockers 46 via one or more support assemblies 50.

As shown in plain view, the side tubes 40 can support caster housings 52, which in turn are suitable for supporting the caster stems. The rear wheels 18 can be supported in a fixed relation to the side tubes 40 by any conventional means, including the axle mounting plate 54 shown.

The footrest assemblies 34 can include a member, such as the tube 56, that is telescopically received by, or otherwise adjustably related to, the side tubes 44. The tube 56 is preferably adjustable relative to the side tubes 44 to permit the longitudinal position of the tube 56 to be located in various fixed positions relative to the side tubes 44. This accommodates growth in the vehicle 10 in a longitudinal direction.

It should be noted that an alternative seat back 58 is shown in FIGS. 3 and 4, wherein opposing handles 60 are provided on opposing canes 62. The handles 60 can be telescopically received in or otherwise adjustably related to the canes 62. An additional assist handle 64 can optionally extend rearward from the canes 62.

Figure 5:
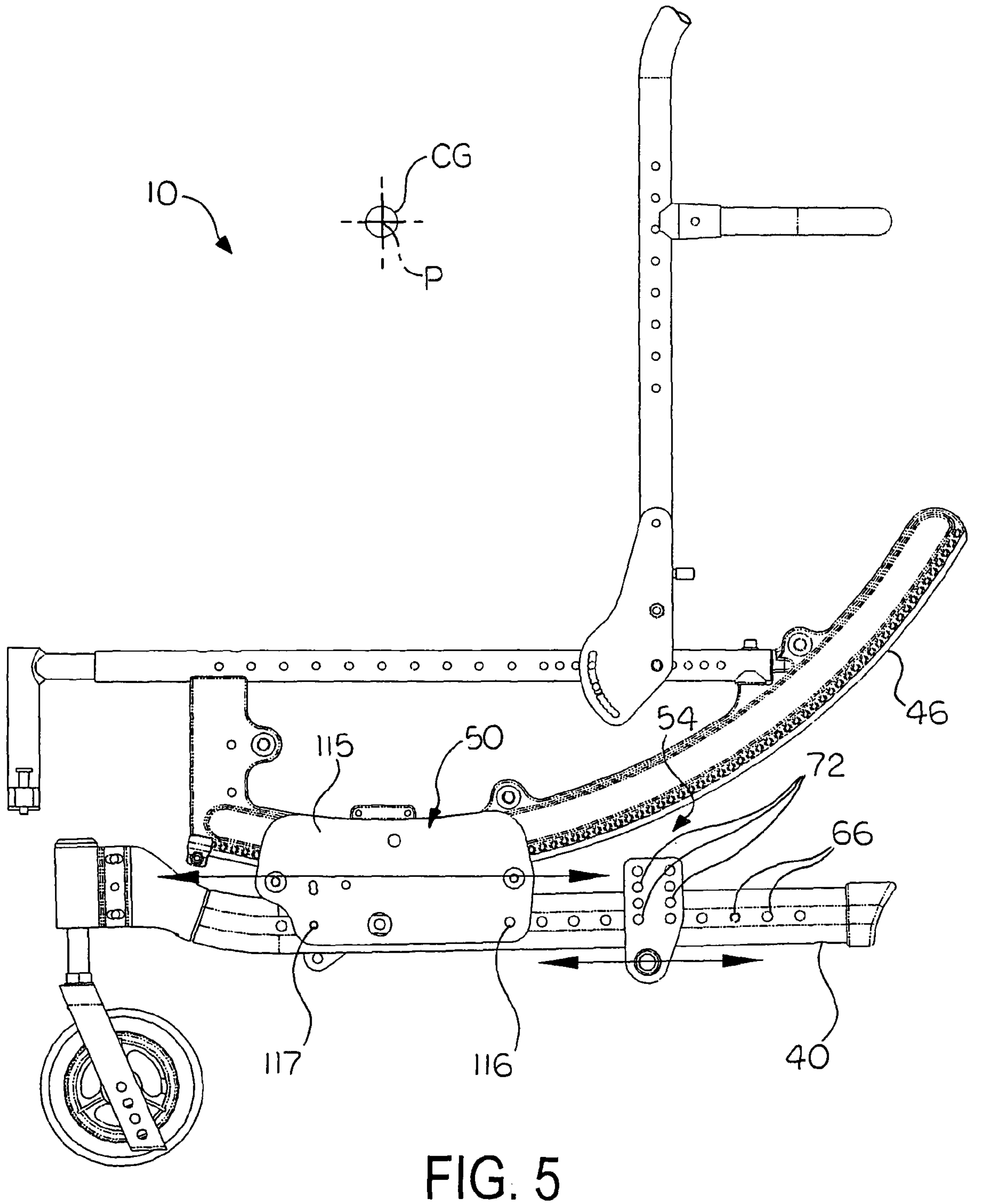
FIG. 5 is a side elevational view of a base frame and a seat frame with graphic designations indicating directional movement of a rocker support and axle mounting plate.

As depicted in FIG. 5, the support assemblies 50 and axle mounting plates 54 preferably adjustable in a longitudinal direction. This can be accomplished in any suitable manner. For example, in the illustrated embodiment, the side tubes 40 can be provided with a series of longitudinally spaced holes 66. The support assemblies 50 and axle mounting plates 54 can each be provided with holes 116, 117, and 72 that are spaced to align with the holes 66 in the side tubes 40. Fasteners (not shown) can be adapted to be secured in the aligned holes to hold the support assemblies 50 and axle mounting plates 54 in a substantially fixed relation to the side tubes 40. To move the support assemblies 50 and axle mounting plates 54, simply remove the fasteners. The support assemblies 50 and axle mounting plates 54 can be moved longitudinally (i.e., in directions to the left and right when viewing FIG. 5). This permits the weight, as depicted at W in FIG. 6, of the vehicle occupant to be adjusted longitudinally with respect to the wheelbase, for example, to optimize steering performance and stability. A preferred weight distribution is about 40 percent to the front casters 16 and 60 percent to the rear wheels 18. Such adjustment also permits the wheelbase to grow longitudinally, for example, to accommodate occupants of varying size.

Figure 6:
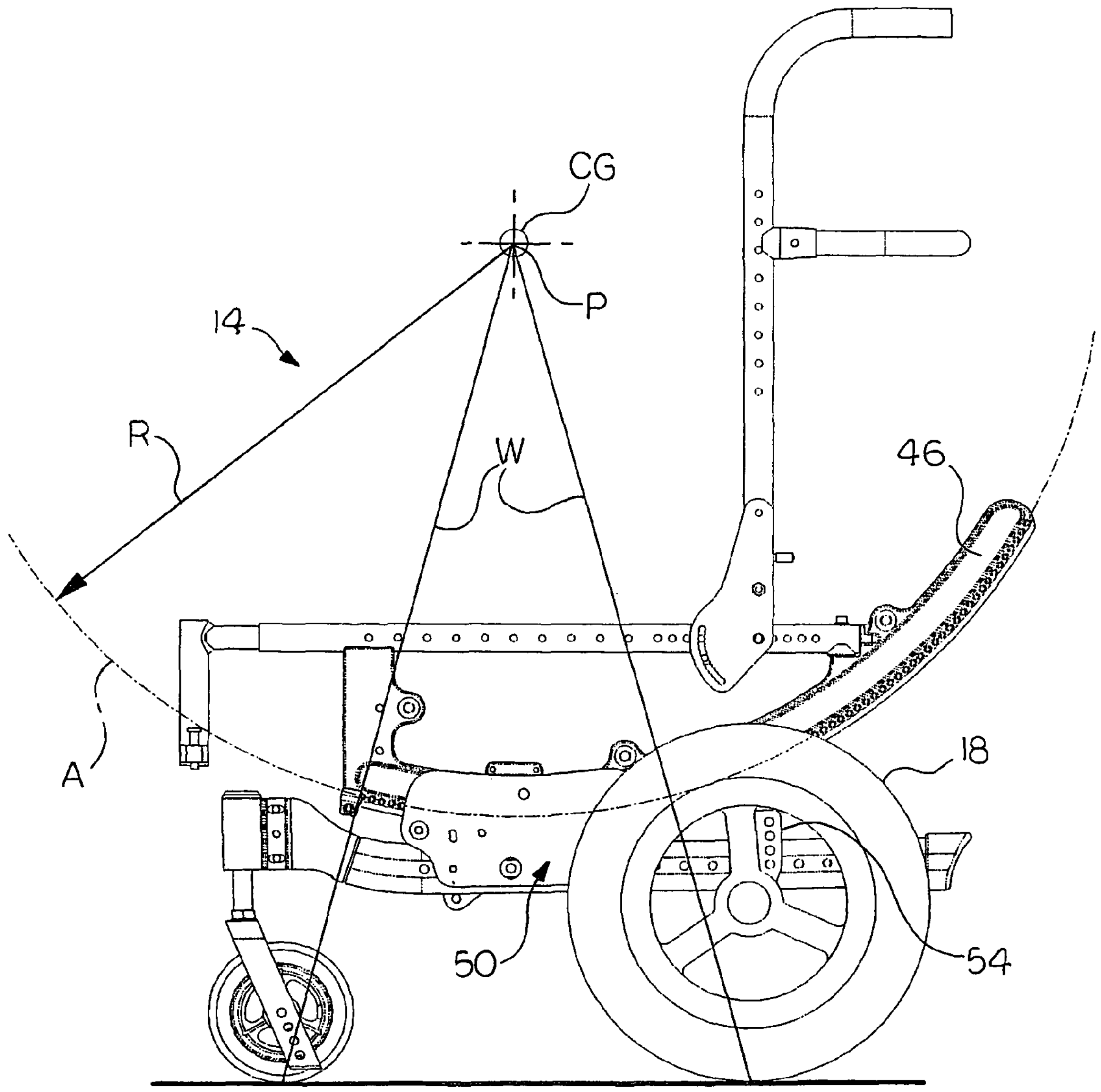
FIG. 6 is a partial side elevational view of the vehicle with graphic designations indicating the focal point of the arc of a rocker, which is substantially coincident with the center of gravity of a vehicle occupant, and the weight distribution of the occupant to a supporting surface.

Continuing with FIG. 6, the arc A preferably has a radius R that is constant or substantially constant. The center of curvature or focal point P of the arc A is preferably coincident with the center of gravity CG of the vehicle occupant. The constant radius arc A and the coincident focal point P and center of gravity CG are preferred so that the center of gravity CG remains fixed or substantially fixed as the seat assembly 14 is tilted (i.e., as the seat assembly 14 is displaced in clockwise and counter-clockwise directions when viewing FIG. 6).

Figure 7:
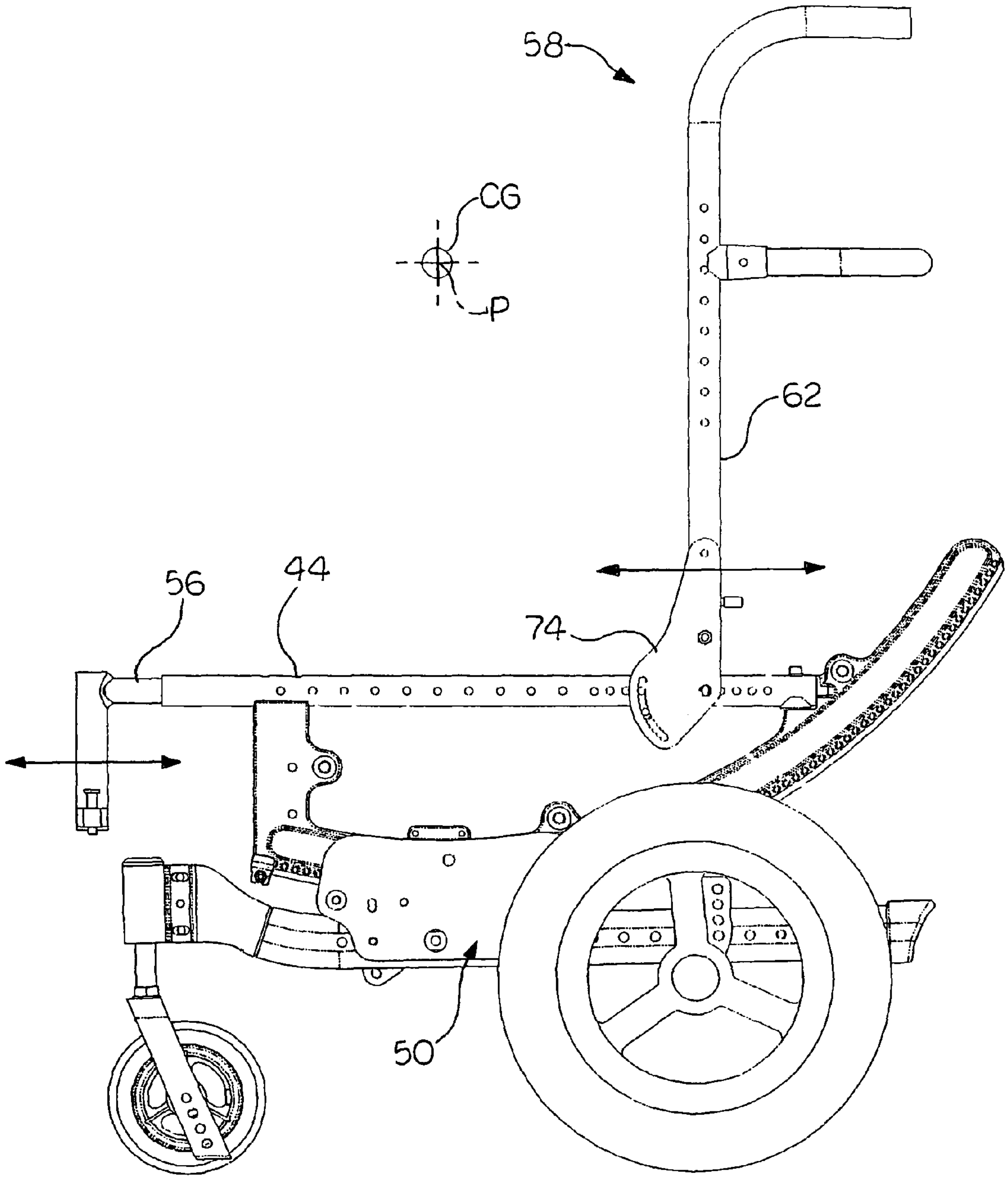
FIG. 7 is a partial side elevational view of the vehicle with graphic designations indicating directional movement of a footrest assembly and seat back canes.

In FIG. 7, there are directional arrows (i.e., pointing to the left and right when viewing the drawing) that depict movement of the footrest assemblies 34 and the seat back canes 62, for example, to permit the seating system to be adjusted for different size occupants. The growth capability of these two components in two directions further enable adjustment such that the vehicle occupant's center of gravity is maintained at the center of rotation or focal point P. This can be accomplished in any suitable manner. For example, the tubes 56 of the footrest assemblies 34 can be telescopically received by or otherwise adjustable related to the side tubes 44 and the canes 62 can have couplings 74 or other suitable members that are attachable for movement relative to the side tubes 44. The tubes 56 and the couplings 74 can have holes, which are adapted to align with holes in the side tubes 44 of the seat frame 20, and fasteners (not shown) can be adapted to and secured in the holes.

Figure 8:
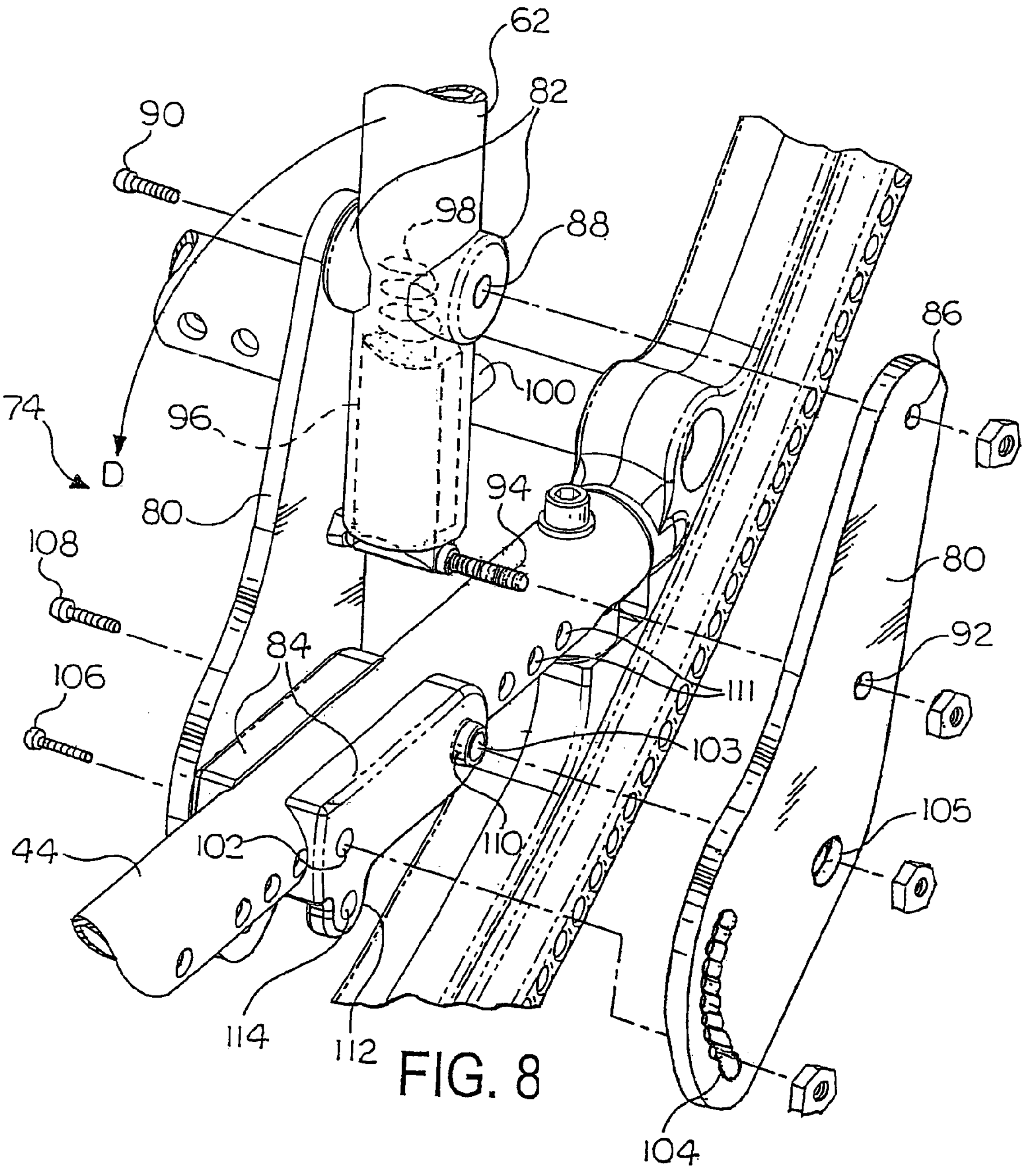
FIG. 8 is an enlarged front perspective view of a coupling for attaching the seat back to the seat frame.

The couplings 74 are preferably structured to be adjustable with minimal disassembly. As shown in FIG. 8, the couplings 74 can include an assembly of plates 80 and saddles 82, 84. Upper ends of the plates 80 can be attached to the bottom of the canes 62 by cane saddles 82. Holes 86, 88 in the plates 80 and saddles 82 can align with holes (not shown) in the canes 62 to receive a fastener 90. This fastener 90 can form a pivot for the canes 62 to fold downward in the direction D relative to the side tubes 44 of the seat frame 20. Each plate 80 can have another hole 92 just below the bottom of the canes 62. These plate holes 92 can align with one another to receive another fastener 94. This fastener 94 can be selectively engaged and disengaged by a piston 96 that is biased downward by a spring 98. A lever 100 or other suitable control member extending rearward from the piston 96 can be displaceable to raise the piston 96 out of engagement with the fastener 94 to permit the canes 62 to be folded downward. Lower ends of the plates 80 can be attached to the side tubes 44 of the seat frame 20 by opposing elongate saddles 84. The lower ends of the plates 80 and the elongate saddles 84 can have aligning holes 102, 103 and 104, 105 for receiving fasteners 106, 108 for securing the plates 80 and elongate saddles 84 to the side tubes 44 of the seat frame 20. It should be noted that the elongate saddles 84 have bosses 110 extending laterally therefrom. The bosses 110 are coincident with the rear holes 103 in the saddles 84. The rear holes 105 of the plates 80 are preferably sized to receive the bosses 110. The upper fasteners 90, 94 hold the plates 80 together with the bosses 110 in the holes 105. The bosses 110 function as a pivot for adjusting the angle (e.g., the angle of recline) of the canes 62 relative to the side tubes 44 of the base frame 20. The lower fasteners 106, 108 are preferably removable to permit the plates 80 and elongate saddles 84, together with the canes 62, to move longitudinally relative to the side tubes 44 of the seat frame 20.

As clearly illustrated, the holes 102, 103 in the elongate saddles 84 are adapted to align with holes 111 in the side tubes 44 of the seat frame 20. The fasteners 106, 108 can be received in any of the aligned holes, for example, to accommodate growth in the vehicle 10 in a longitudinal direction and permit a wide range or variation in the positions of the footrest assemblies 34 and the support assemblies 50 to permit the vehicle occupant to be positioned with his or her center of gravity CG substantially coincident with the arc A of the focal point P.

In FIG. 8, there are also illustrated tabs 112 extending downward from the elongate saddles 84. The tabs 112 have holes 114 extending laterally therethrough. The front holes 102 in the elongate saddles 84 and the holes 114 in the tabs 112 align with the holes 104, which are preferably an arcuate arrangement of scalloped holes, in the plates 80. The rear hole 105 in each plate 80 is preferably the focal point of the arcuate arrangement. The front lower fastener 106 is adapted to be received through the front holes 102 in the elongate saddles 80 or the holes 114 in the tabs 112 and through any one of the scalloped holes 104. Alternatively, the front lower fastener 106 is adapted to be received through the front hole 102 in the elongate saddles 80, and an optional additional fastener (not shown) is adapted to be received through the holes 119 in the tabs 112 and through another one of the scalloped holes 104. This permits the angle of the canes 62 to be adjusted relative to the side tubes 44 of the seat frame 20 to recline the canes 62.

The functionality of coupling 74 results from the use of elongate saddles 84. These saddles 84 permit angular and longitudinal adjustment of the canes 62 and plates 80 with greater ease than conventional coupling systems that perform a similar function. For both angular and longitudinal adjustment, the upper fasteners 90, 94 remain intact with plates 80 and saddles 82.

Angular adjustment of the cane 62 and plates 80 relative to the seat tube 44 of the illustrated coupling 74 can be accomplished by removing the front lower fastener 106 and loosening the back lower fastener 108 to reduce the clamping pressure of the plates 80 on the saddles 84 and the side tubes 44. The canes 62 and plates 80 can then freely rotate coincidentally about the rear plate holes 105 and rear saddle holes 103.

Longitudinal adjustment of the canes 62 and plates 80 of the illustrated coupling 74 can be accomplished by removing only the front and back lower fasteners 106, 108. No other parts require removal or are free to loosen or drop out during this adjustment because the back lower holes 105 in the plates 80 are coincidentally engaged about the bosses 110 of the saddles 84 and the plates 80 maintain a pre-load against the saddles 84 and side tube 44 due to the installed clamping force of upper fasteners 90, 94 so that the plates 80 remain engaged with the saddles 84. When the desired longitudinal location of the canes 62 along side tube 44 is established, the front and back lower fasteners 106,108 can be re-installed and secured in place.

It should be noted, that during longitudinal adjustments, pre-established angular settings of the canes 62 and plates 80 can be preserved by first removing the back rear fastener 108 from the holes 103, 105 in the saddles 84 and plates 80 and then placing the back rear fastener 108 completely through the holes 114 in the saddle tabs 114 and the scalloped holes 104 in the plates 80. The back rear fastener 108 is now in a shear mode that maintains the angular position of the cane 62 and the plates 80. Next, by removing front lower fastener 106, the entire assembly (i.e., the cane 62 and the plates 80) is free to translate longitudinally along side tube 44.

Figure 9:
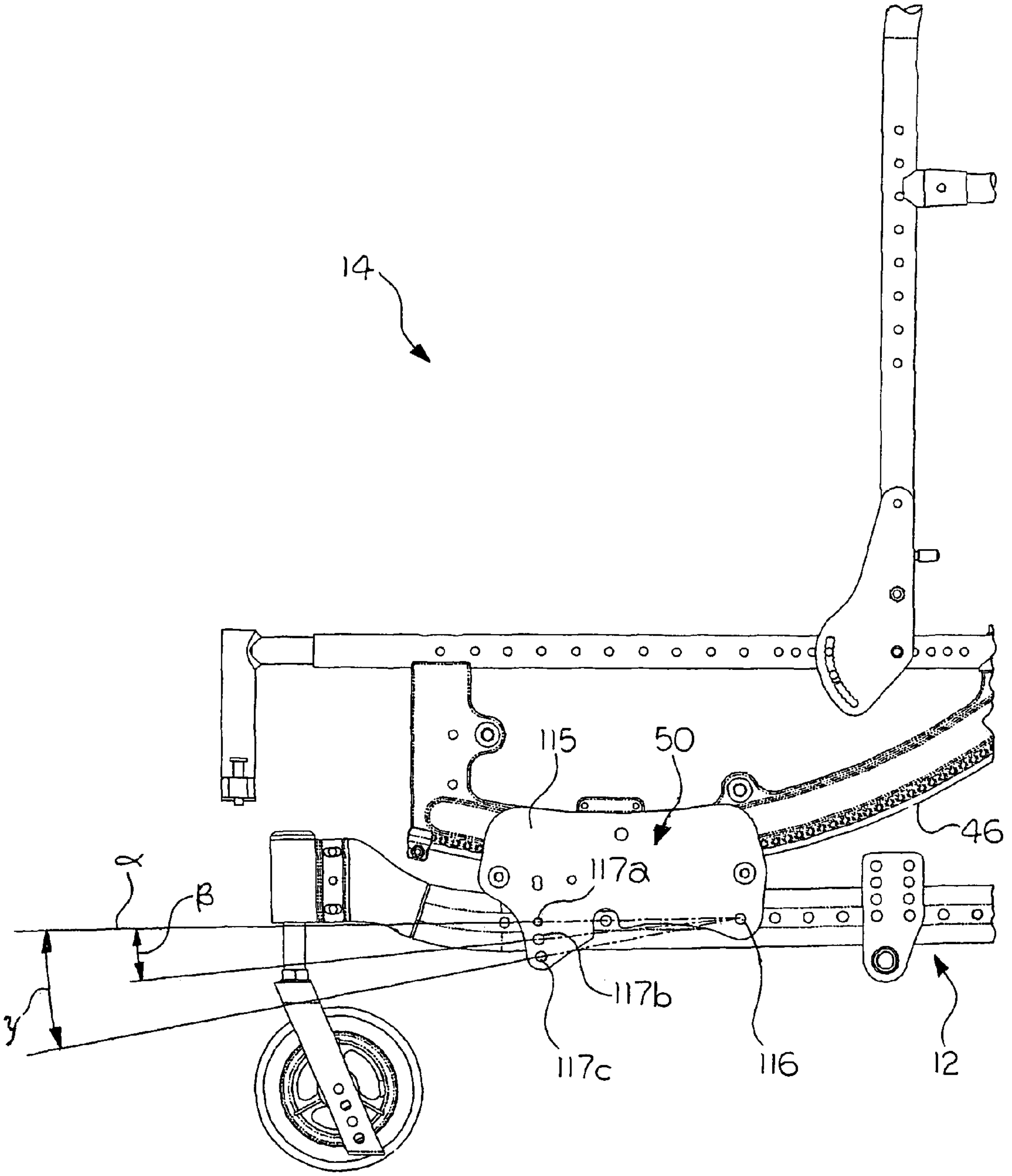
FIG. 9 is a partial side elevational view of the vehicle with graphic designations indicating an adjustment in the angle of the rocker support.

In FIG. 9, there is illustrated an example of a structure for adjusting the angle of the rockers 46. It should be appreciated that the structure is provided for illustrative purposes and that other structures could be used for carrying out the invention. The structure shown is supported by the support assemblies 50. The support assemblies 50 may include one or more side plates 115, each having a first mounting hole 116 therein, and a plurality of spaced apart angle adjustment holes 117*a*, 117*b*, 117*c* in spaced relation to the first mounting hole 116. The first mounting hole 116 in combination with one of the angle adjustment holes 117*a*, 117*b*, 117*c* supports the seat assembly 14 at a fixed or substantially fixed angle relative to the base 12 and in relation to the other angle adjustment holes 117*a*, 117*b*, 117*c*. For example, the first mounting hole 116 and a first one of the angle adjustment holes 117*a* support the support assembly 50 at an angle α, which is about zero degrees relative to the side tubes 40, although other angles may be desired. The first mounting hole 116 and a second one of the angle adjustment holes 117*b* support the support assembly 50 at an angle β, which is about five degrees relative to the side tubes 40. Although other angle may be desired. The first mounting hole 116 and a third one of the angle adjustment holes 117*c* support the low-friction support assembly 50 at an angle γ, which is about ten degrees relative to the side tubes 40. It should be clearly understood that these three angular adjustments affect the tilt range of the seat assembly 14. It should be understood that the 0, 5 and 10 degree angular adjustments shown are provided for illustrative purposes and that the invention can be practiced with other suitable angular adjustments.

Figure 10:
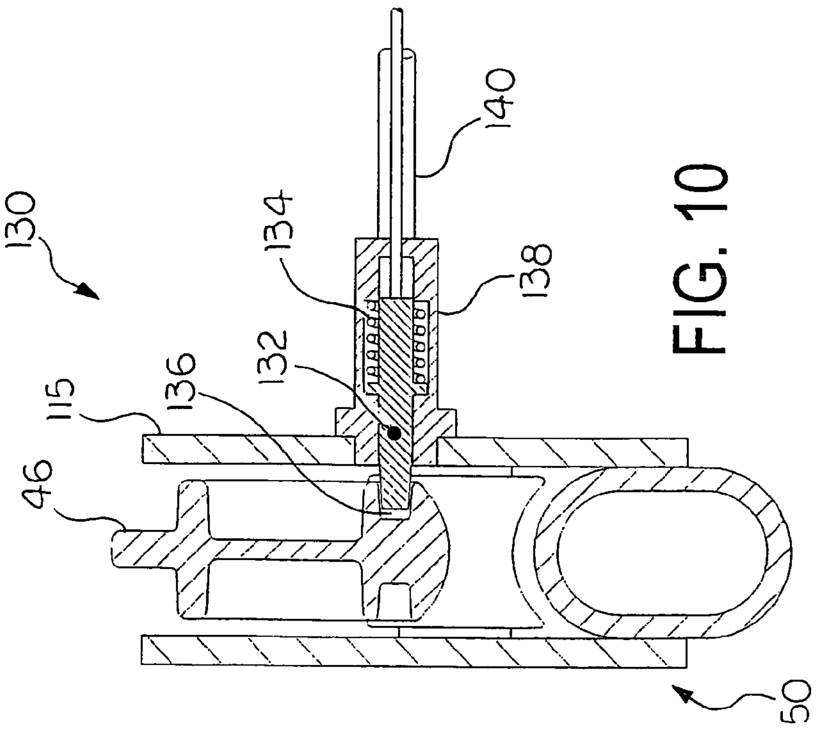
FIG. 10 is an enlarged-scale sectional view in elevation of a lock assembly for locking the rocker in relation to the rocker support.

In FIG. 10, there is illustrated a lock assembly 130 for locking the rockers 46 in relation to one or more support assemblies 50. The lock assembly 130 can be supported by the inner plate 115 and can include a protrusion that engages any one of a plurality of recesses in the rockers 46. In the illustrated embodiment, a plunger pin 132 can be biased by a spring 134 into engagement with any one of a plurality of holes 136 in rockers 46. The plunger pin 132 and the spring 134 can be housed in a housing 138 that is threaded, pressed, or otherwise held in a fixed relation to a hole in the inner plate 115 of the support assemblies 50. The plunger pin 132 can be actuated by a cable 140, which can be controlled by a conventional lever (e.g., the levers 154 shown in FIG. 12). The lever can be supported on one of the handles 60 of the seat back 58 to permit the plunger 132 to be actuated by an attendant.

Figure 11:
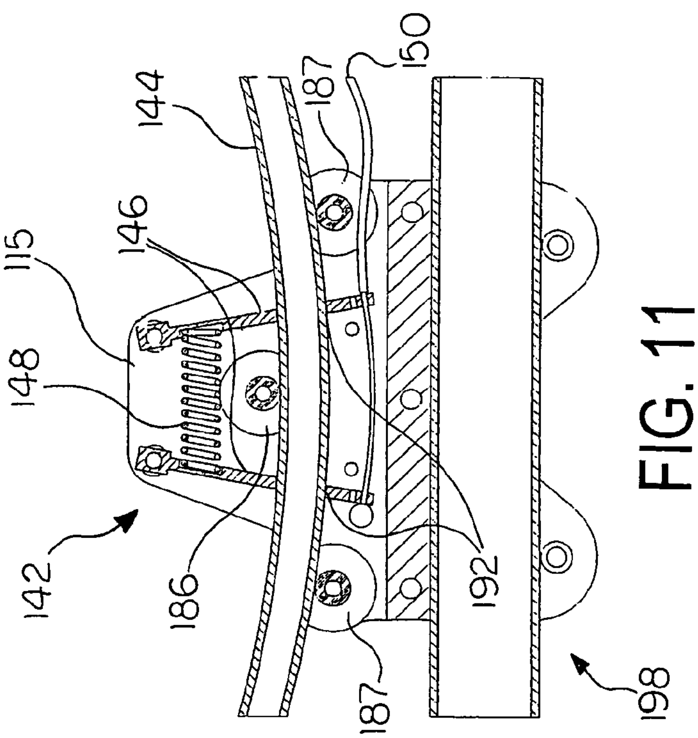
FIG. 11 is an enlarged sectional view in elevation of an alternative lock assembly.

An alternative lock assembly 142 is illustrated in FIG. 11. This lock assembly 142 would be suitable for use with a track, such as the rocker 144 shown, which is tubular and round in cross-section. The lock assembly 142 can include a pair of locking plates 146 that are held in spaced relation by a spring 148. The spring 148 can be attached for movement relative to the side plate 115 of one or more of the support assemblies 50. The spring 148 is adapted to bias the locking plates 146 outward in opposing directions (i.e., in the left and right directions when viewing FIG. 10) and into engagement with the rocker tube 144 to prevent the rocker tube 144 from moving relative to the locking plates 146. Note that an actuator cable 150 can extend through the locking plates 146 and control the locking plates 146 to move the locking plates 146 out of engagement with the rocker tube 144 to permit the rocker tube 144 to move.

Figure 12:
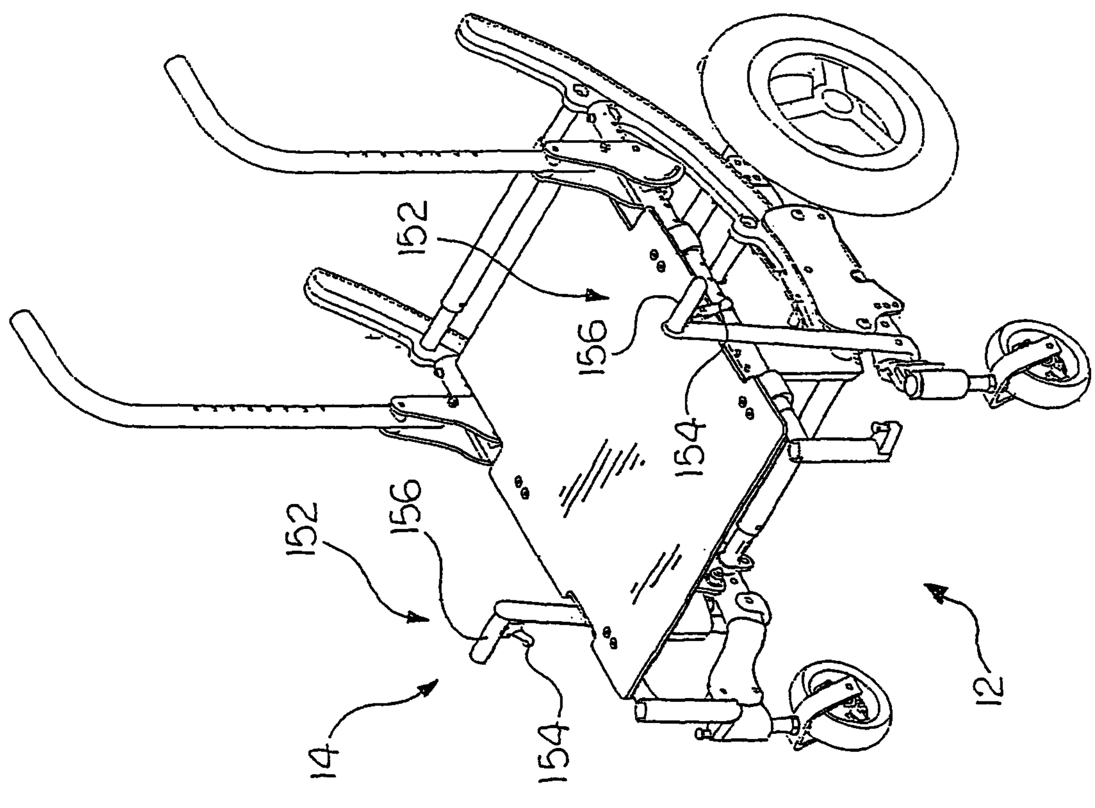
FIG. 12 is a reduced-scale front perspective view of a vehicle according to an alternative embodiment of the invention with handle assemblies that permit control and displacement of the seat frame by the vehicle occupant.
Figure 15B:
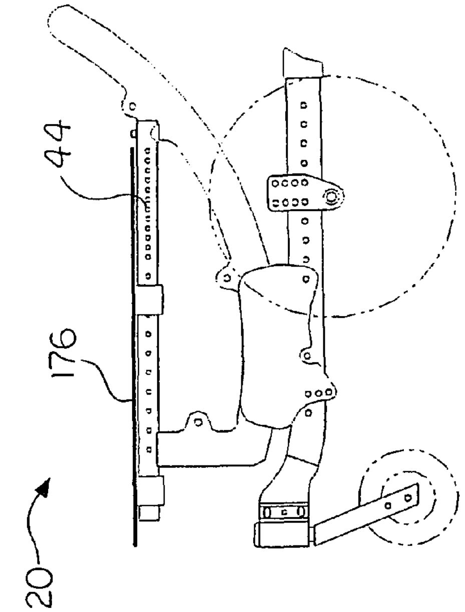
FIGS. 15A and 15B are reduced-scale partial front and side elevational views of the vehicle with a standard seat configuration.

In FIG. 12, there is illustrated a vehicle having handles 152 with supporting levers 154 for actuating the cables for controlling the rocker locking assemblies, such as the locking assemblies described above. The handles 152 can also be provided with handholds 156 to enable the vehicle occupant to tilt his or herself in the seat assembly 14 relative to the base 12.

Figure 13:
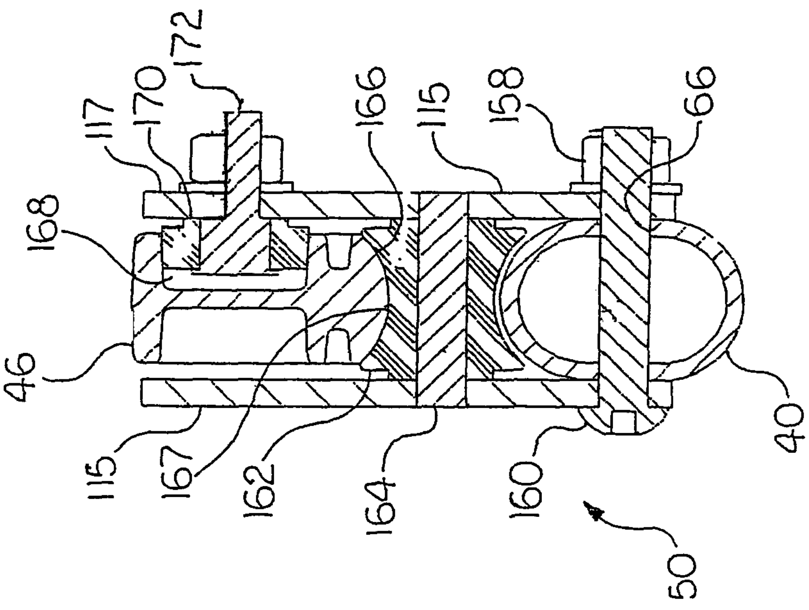
FIG. 13 is an enlarged-scale sectional view in elevation of the base frame, rocker support, and rocker.

In FIG. 13, there is illustrated a sectional view of a side tube 40 of the base 12, a rocker 46 of the seat assembly 14, and a support assembly 50 supporting the rocker 46 relative to the side tube 40. In accordance with the illustrated embodiment, the side tube 40 of the base 12 is situated between the side plates 115 of the support assembly 50. As stated above, the side plates 115 can be attached to the side tube 40 by fasteners, such as the bolt 160 shown, that pass through holes 66 (also shown in FIG. 5) in the side tube 40 that align with corresponding holes in the side plates 115. A bottom roller 162 can be supported for movement above the side tubes 40 by an axle 164. The bottom roller 162 can be supported in spaced relation to the side tubes 40. The rocker 46 can have a contact surface 166 that engages the bottom roller 162. The rocker 46 and the bottom roller 162 preferably have mating surfaces, such as the rounded contact surface 166 of the rockers 46 and the saddle shaped surface 167 of the bottom roller 162. The rocker 46 can further have an arcuate shaped relief 168 in a side thereof. The arc of the relief 168 preferably has a radius that is constant or substantially constant. A top roller 170 preferably engages the relief 168 to trap a portion of the rocker 46 against the bottom roller 162. The top roller 170 is preferably supported by an adjustable eccentric cam bolt 172. It should be appreciated that the relief 168 and the top roller 170 can include mating surfaces that engage one another with a force that depends upon the position of the eccentric cam bolt 172. It should be appreciated that the instant invention is not intended to be limited to the rocker 46 and rollers 162, 170 set forth above but can be practiced with other low friction elements, such as but not limited to one or more bearings, slides, skids, pinions, and/or the like.

Figure 14B:
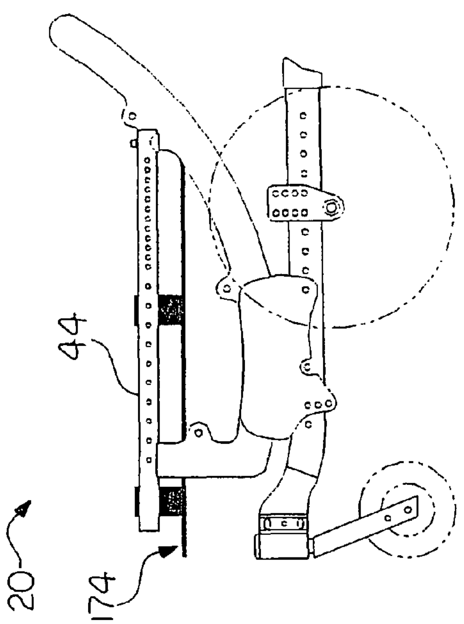
FIGS. 14A and 14B are reduced-scale partial front and side elevational views of the vehicle with a drop seat configuration.
Figure 14A:
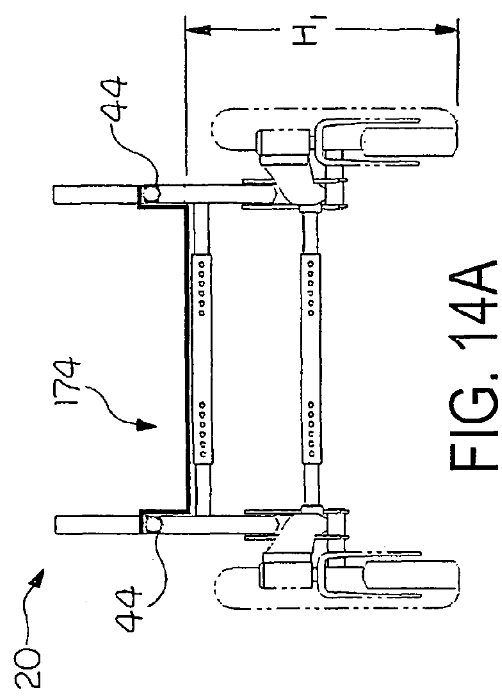
Figure 15A:
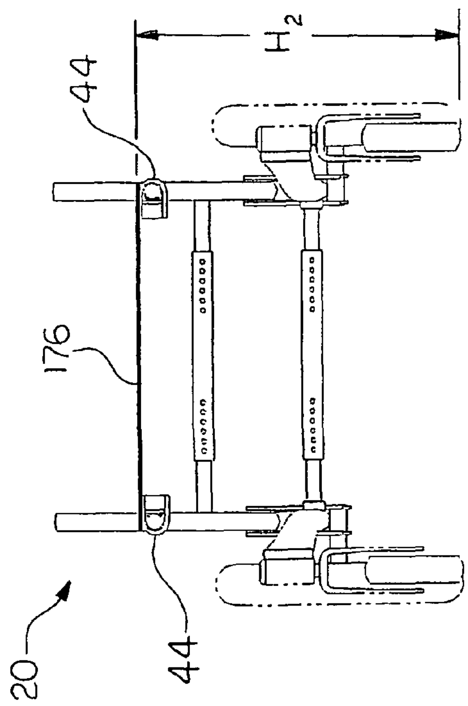
Figure 16B:
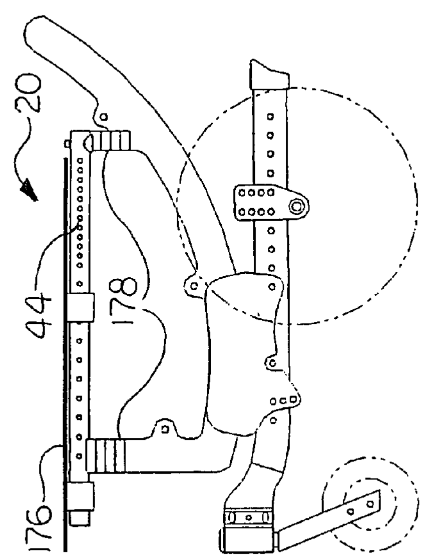
FIGS. 16A and 16B are reduced-scale partial front and side elevational views of the vehicle with a standard seat configuration with spacers elevating the seat.
Figure 16A:
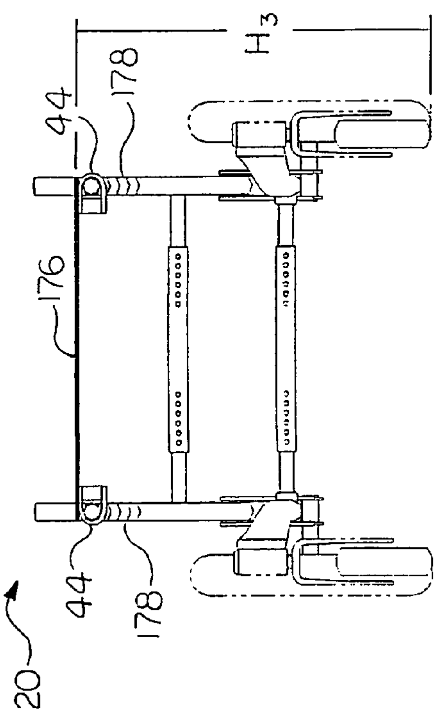
Figure 17B:
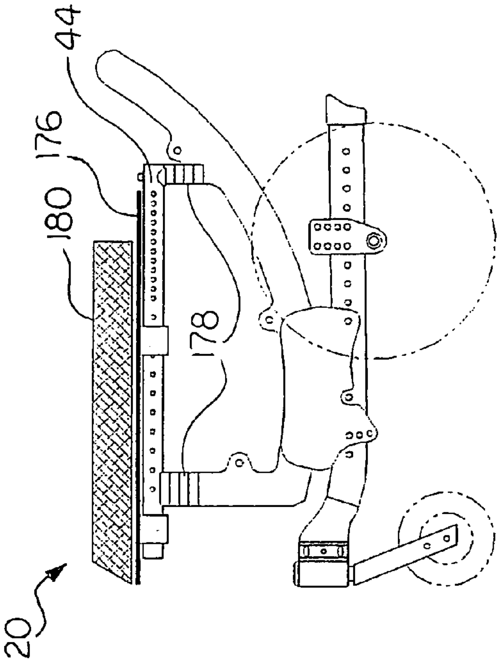
FIGS. 17A and 17B are reduced-scale partial front and side elevational views of the vehicle with a standard seat configuration with spacers elevating the seat and a cushion supported by the seat.
Figure 17A:
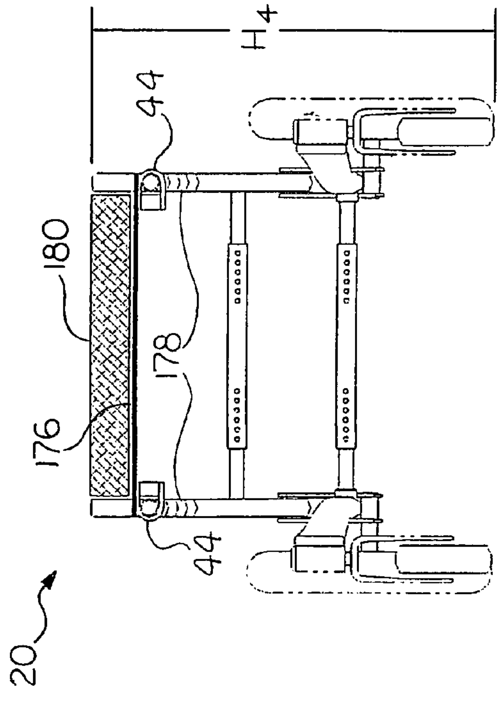

As shown in FIGS. 14A through 17B, the seat assembly 14 is adapted to support a variety of seats. For example, the seat 174 illustrated in FIGS. 14A and 14B is a drop seat, which is adapted to be supported below the side tubes 44 of the seat frame 20 so that the height $H_1$ of the seat 174 is minimized. The seat 176 illustrated in FIGS. 15A and 15B is a standard seat, which is adapted to be supported atop the side tubes 44 of the seat frame 20 so that the height $H_2$ of the seat 176 is substantially the same as the height of the side tubes 44. The seat 176 illustrated in FIGS. 16A and 16B is a standard seat, which is adapted to be supported above the side tubes 44 of the seat frame 20 by spacers 178 so as to raise the side tubes 40 and the seat 176 to a greater height $H_3$. It should be quite clear that the height $H_3$ is dependent on the size and number of spacers 178 used. The seat 176 illustrated in FIGS. 17A and 17B is a standard seat similar to that shown in FIGS. 16A and 16B, further supporting a cushion 180, which is elevated to a greater height $H_4$ above the side tubes 44. The aforementioned seats 174, 176 and spacers 178 are adapted to be attached in any suitable manner. These and other seats can be supported by the seat assembly 14. The importance of the above mentioned seat height adjustments is that it enables vertical positioning of the occupant's center of gravity to be coincident or substantially coincident with center of curvature or focal point P of the rocker 46.

Figure 18B:
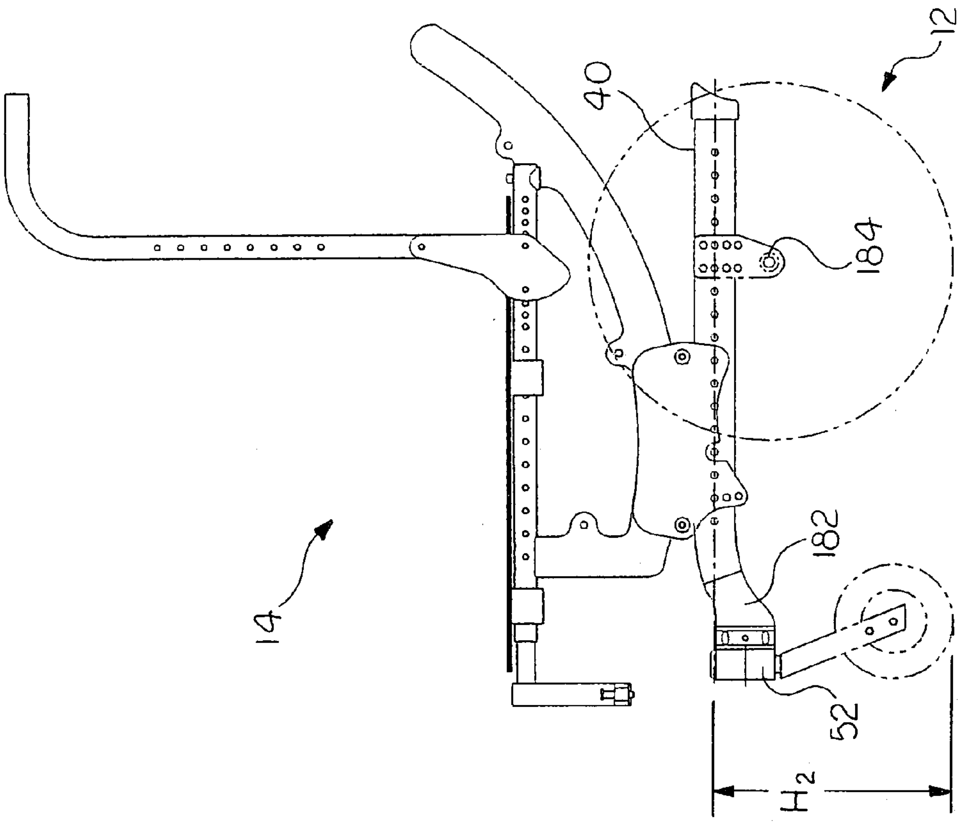
FIGS. 18A and 18B are reduced-scale partial side elevational views of the vehicle with the base frame in "up" and "down" positions.
Figure 18A:
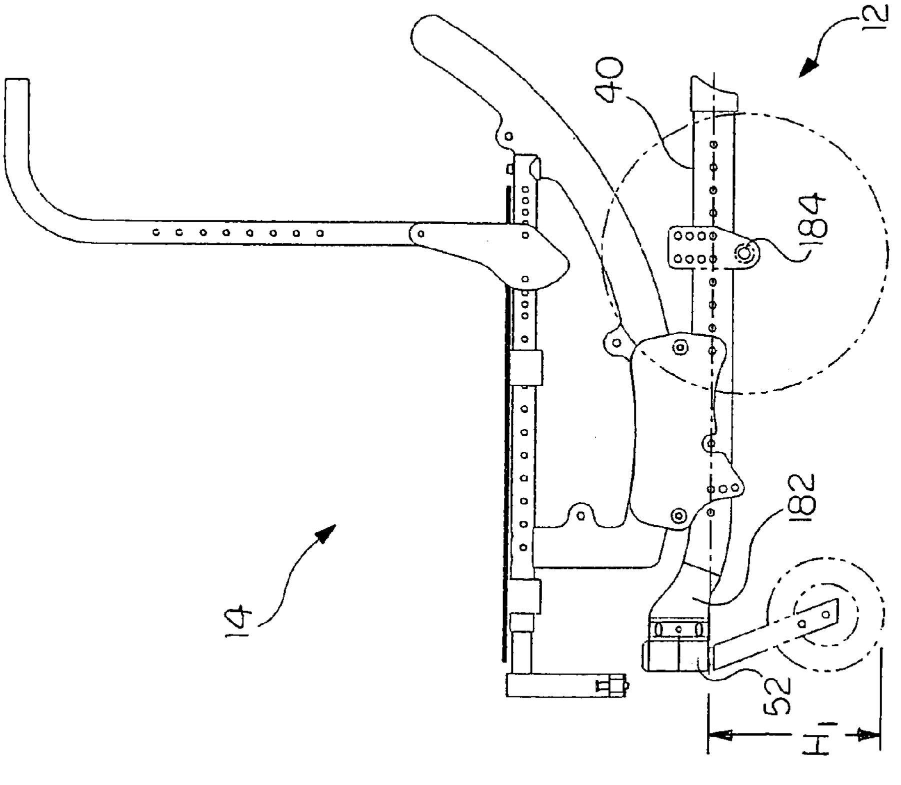

In FIGS. 18A and 18B, there is illustrated by example means for adjusting the height of the caster housings 52. The adjusting means can be any suitable adjusting means including but not limited to an offset 182, as shown at the front end of the side tubes 40 of the base 12. As shown in FIG. 18A, the offset 182 can be directed up to minimize the height $H_1$ of the seat assembly 14. In FIG. 18B, the offset 182 can be directed down to maximize the height $H_2$ of the seat assembly 14. Also note the change in the position of the axle sleeve 184 relative to the side tubes 40 of the base 12 in the two drawings. The close proximity of the axle sleeve 184 to the side tubes 40 lowers the rear of the seat assembly 14. The converse holds true if the axle sleeve 184 is moved down and away from the side tubes 40. That is, the rear of the seat assembly 14 is raised accordingly. The axle sleeve 184 can be positioned above the side tubes 40 to further lower the rear of the seat assembly 14.

Figure 19B:
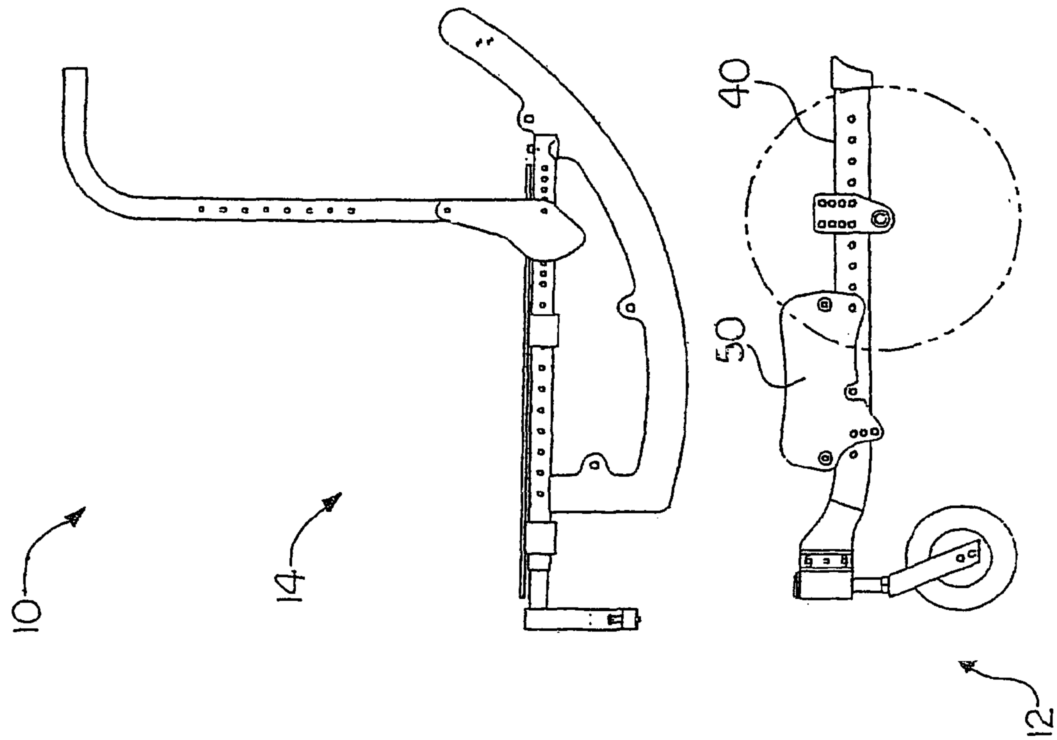
FIGS. 19A and 19B are reduced-scale partial side elevational views of alternative means for removing the seat.
Figure 19A:
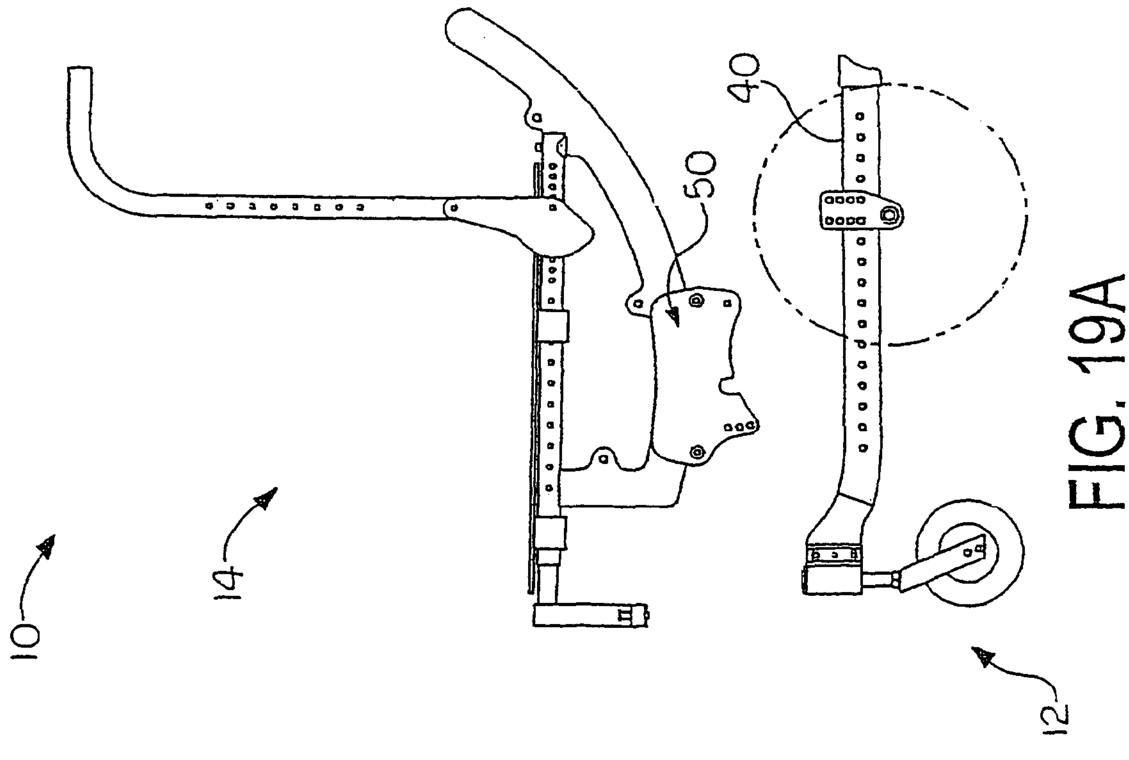

As illustrated in FIGS. 19A and 19B, it is preferable that the seat assembly 14 be removed from the base 12. This can be accomplished in any suitable manner. For example, the support assemblies 50 can be releasably attached (i.e., preferably readily removable with or without the aid of tools) to the side tubes 40 of the base 12, as shown in FIG. 19A, so that the support assemblies 50 and thus the seat assembly 14 can be easily removed from the base 12 for ease in transporting the vehicle 10. Alternatively, the seat assembly 14 can be releasably attached to the support assemblies 50, as shown in FIG. 19B, so that the seat assembly 14 can be easily removed from the support assemblies 50. One of ordinary skill in the art of the invention, without undue experimentation, could provide suitable means for releasably attaching the seat assembly 14, including a variety of quick-release fasteners.

It should be noted that the vehicle 10 can be comprised of two primary parts: the base 12 and the seat assembly 14. The seat assembly 14 can include the seat frame 20, the seat back 22, 58, and the footrest assembly 34, all preferably rigidly or substantially rigidly supported on the rockers 46. The support assemblies 50 can capture the rockers 46 and constrain the motion of the seat frame 20 to pure rotation about the rocker's center of curvature (i.e., focal point P).

In a preferred embodiment, four bottom rollers 162 (i.e., two rollers 162 per rocker 46) preferably support the underside surface of the rockers 46. These rollers 162 are preferably saddle-shaped to position the rockers 46 along the center of the support assembly 50. The rockers 46 preferably have a similarly shaped profile that fits within the saddle-shaped rollers 162. These mating shapes serve to align the rockers 46 with the rollers 162.

Four top rollers 170 (i.e., two top rollers 170 per rocker 46) preferably contact an upper curved surface of the rockers 46, capturing the rockers 46 and preventing the rockers 46 from lifting off the base 12. The top and bottom rollers 162, 170 allow the seat frame 20 to rotate with minimal friction about the center of curvature P of the rockers 46.

It should further be noted that the holes 136, which serve as the engagement features for the spring-loaded plunger pins 132, can be equally spaced and arranged in a series, for example, between the upper and lower surfaces of the rockers 46, along an arc concentric or substantially concentric with the curvature of the rockers 46. The holes 136 can be spaced discrete angular distances apart, such as one-degree apart, to permit incremental adjustments in the tilt angle of the seat frame 20. Multiple pins 132 could engage multiple holes 136 of the rockers 46 to reduce sheer forces encountered by the pins 132 when locking the rocker 46 in position. It should be clearly understood that the tilt angle of the seat frame 20 can be changed, for example, by squeezing levers to release the pins 132 from the holes 136 and rotating the seat frame 20 by pushing or pulling on handles. When the levers are released, the pins 132 can engage with the closest aligned holes 136, locking the seat frame 20 with respect to the base 12 at a specific tilt angle.

Figure 20A:
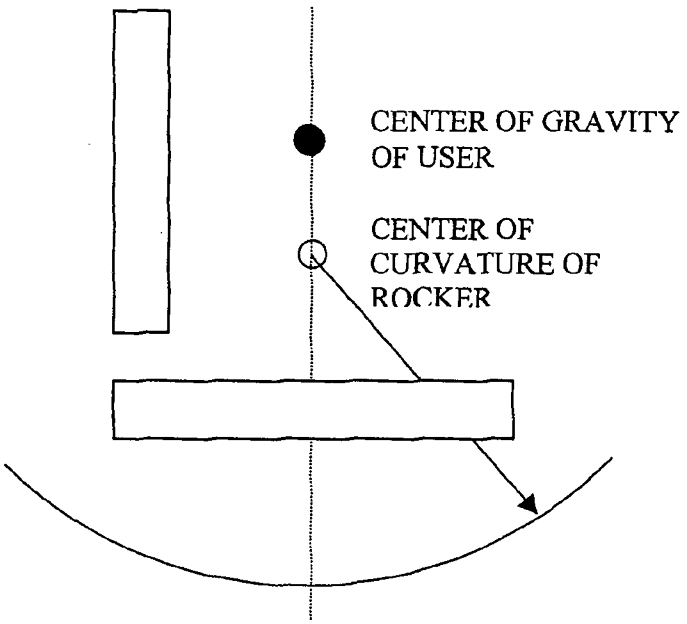
FIGS. 20A and 20B are diagrammatic representational views of the vehicle with the seat frame positioned so that the vehicle occupant's center of gravity is above the focal point of the arc of a rocker.
Figure 20B:
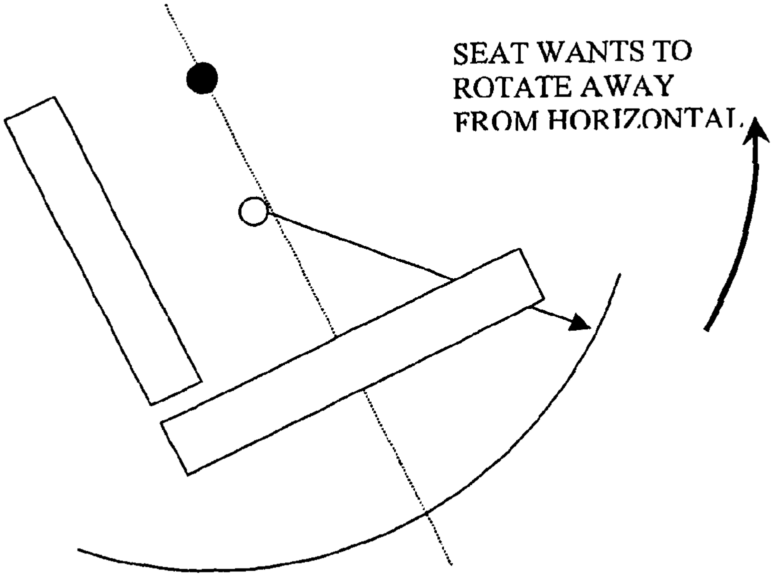
Figure 21A:
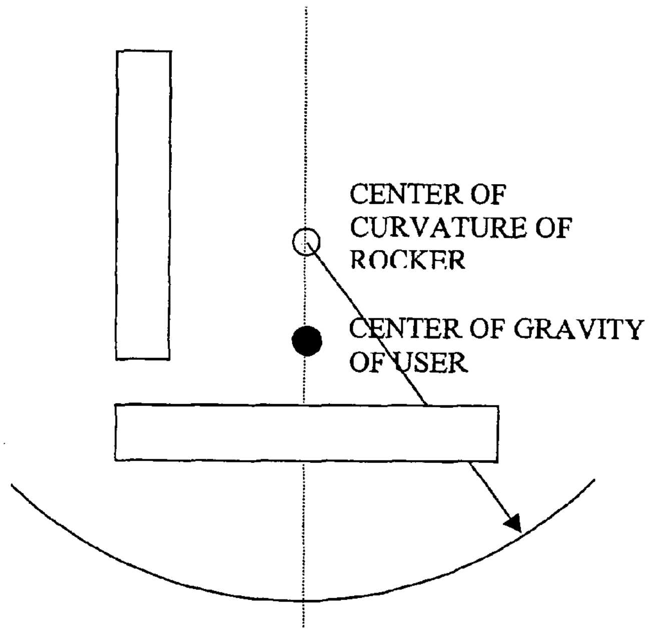
FIGS. 21A and 21B are diagrammatic representational view of the vehicle with the seat frame positioned so that the vehicle occupant's center of gravity is below the focal point of the arc of a rocker.
Figure 21B:
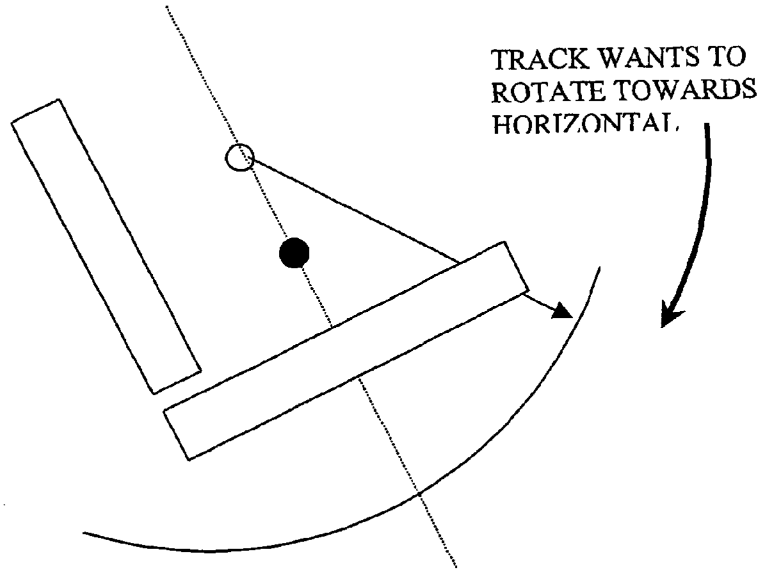
Figure 22:
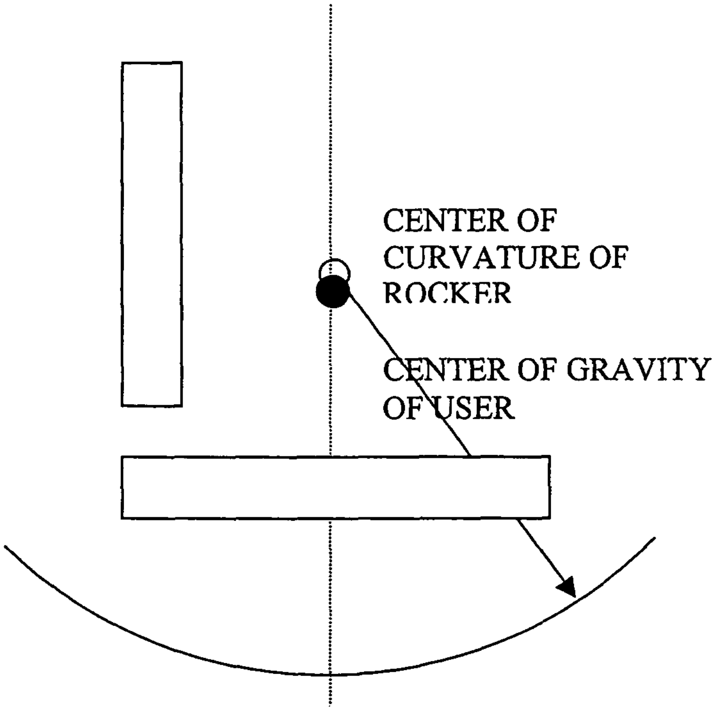
FIG. 22 is diagrammatic representational view of the vehicle with the seat frame positioned so that the vehicle occupant's center of gravity is substantially coincident with the focal point of the arc of a rocker.

In order for the vehicle 10 to function as intended, a vehicle occupant's center of gravity should coincide closely with the center of curvature of the rockers. To this end, the vehicle occupant should be properly positioned at the center of curvature or substantially close to the center of curvature of the rockers. For example, the center of gravity of the vehicle occupant can be above the center of curvature or focal point of the rocker (i.e., when the seat frame is substantially horizontal, as shown in FIG. 20A), though placing the center of gravity of the vehicle occupant too far above the center of curvature could create an inverted pendulum effect, which could create an unbalanced load, causing the seat frame to tend to rotate away from horizontal, which may require substantial force to counteract when moving or tilting the seat frame. This phenomena is illustrated in FIGS. 20A and 20B. The center of gravity of the vehicle occupant can also be below the center of curvature of the rocker (i.e., when the seat frame is substantially horizontal, as shown in FIG. 21A). Though this is generally more suitable than being above the center of curvature, placing the center of gravity of the vehicle occupant too far below the center of curvature could create a pendulum effect, which could cause the seat frame to tend to rotate toward horizontal, which may also require substantial force to counteract when moving or tilting the seat frame. This phenomena is illustrated in FIGS. 21A and 21B. In the most preferred embodiment of the invention, the center of gravity of the vehicle occupant is coincident or substantial coincident with the center of curvature of the rocker, as shown in FIG. 22. This is the most suitable relationship because the seating system is in equilibrium or substantially in equilibrium, thus tilting the seat frame requires little force to overcome friction.

The preferred embodiment of the invention can be summarized as a personal mobility vehicle having a seat or seating system that is supported for movement relative to a radial curve or a quasi radial curve (e.g., via a radially curved track or member, or a substantially radially curved track or member) having a focal point that is preferably substantially fixed in space, wherein the seat or seating system is adjustable (e.g., horizontally, vertically, or both) with respect to the curve so that the center of gravity of the seat is adjusted or the center of gravity of any vehicle occupant is sufficiently coincident with the focal point of the curve so that excessive force, or a significant amount of force, is not required to tilt the seat frame with the occupant therein. In one embodiment of the invention, the center of gravity can be sufficiently vertically aligned with the focal point when the seat or seating system is horizontal.

The relative position of the center of gravity of the vehicle occupant and the center of curvature or focal point obviously depends on the weight of the user, and possibly the physical abilities of the attendant. For example, a near coincident relationship between the center of gravity of the vehicle occupant and the focal point P that requires 50 pounds of force to tilt the seat frame and occupant may be a suitable relationship for some attendants but not others. Generally, the center of gravity is preferably within a one-inch radius about the focal point. Depending on the weight of the occupant, the center of gravity can be within a two and one-half inch radius about the focal point, though this may not be suitable of occupants exceeding certain weight capacities. The center of gravity can even be within a three to four inch radius about the focal point, although this may not be a possible range for very heavy occupants. With these ranges in mind, it is conceivable that center of gravity can even be within a radius about the focal point that is in a preferred range of about four to seven percent of the fore to aft length of the vehicle seat 24, or a possible suitable range of about 11 to 17 percent of the fore to aft length of the vehicle seat 24.

To establish a desired relationship between the center of gravity of the vehicle occupant and the focal point P of the arc A, the wheelchair 10 can incorporate several means for adjusting the position of the vehicle occupant to align the occupant's center of gravity CG with or close to the center of curvature of the rockers 46. The seat back 22, 58, the seat 24 (e.g., a pan, a sling, etc.), and the footrest assemblies 34 all preferably incorporate fore/aft adjustability with respect to the center of curvature. Couplings that secure the canes 26, 62 and seat 24 to the seat frame 20 preferably allow for fore/aft adjustability. The tubes 56 supporting the footrest assemblies 34 also preferably have fore/aft adjustability. This adjustability allows proper center of gravity CG alignment for a range of vehicle occupant sizes and accommodates occupant growth.

The center of curvature of the rockers 46 is a virtual point in space that can preferably reside close to the occupant's abdomen. Because the pivot point in this design is a virtual point in space, and not a physical pivot axis near the abdomen, the vehicle occupant is not confined by hardware or the vehicle structure that surrounds the occupant. The absence of any vehicle structure at this location is advantageous because the seating area remains unconfined. This assists in transferring the occupant in and out of the vehicle.

Proper positioning of the center of gravity CG of a vehicle occupant with respect to the base 12 is important for stability and maneuverability of the vehicle. Stability is ensured when the center of gravity CG is properly positioned between the front casters 16 and rear wheels 18 attached to the base frame 12. Increased maneuverability is achieved when the rear wheels 18 support a larger portion of an occupant's weight. Reducing the weight on the front casters 16 produces easier steering and facilitates lifting the front end of the vehicle when crossing thresholds. Because the vehicle 10 is intended to cover a wide range of occupant sizes, the vehicle footprint (i.e., the distance between the front casters 16 and the rear wheels 18) can grow.

The vehicle 10 incorporates several unique features to maintain stability and maneuverability while accommodating a wide range of occupant sizes. The seat frame 20 can be adjusted fore/aft with respect to the base 12. The seat frame 20 can be positioned with respect to the base 12 by moving the support assembly 50 fore/aft along the base 12. The rear wheels 18 may be positioned fore/aft along the base 12 as well. This ability to adjust the size of the vehicle footprint and position the occupant's center of gravity CG fore/aft within this footprint allows the vehicle to be properly configured for stability and maneuverability over a wide range of occupant sizes.

The support assembly 50 can be mounted on the base 12 in a plurality of different angular positions. These positions allow the range of tilt to be changed to accommodate a particular vehicle occupant's needs. Changing the first position allows the seat assembly 14 to tilt in a range of about 5° anterior to about 50° posterior. Changing the second position allows the seat assembly 14 to tilt in a range of about 0° to about 55° posterior. Changing the third position allows the seat assembly 14 to tilt in a range of about 5° posterior to about 60° posterior. An increased posterior tilt range provides more pressure relief to the ischial tuberosities. An increased anterior tilt range assists in transferring the vehicle occupant in and out of the vehicle 10 and allows a occupant to foot propel. These tilt ranges allow the tilt range to be customized to a particular occupant's needs.

The rocker 144 according to an alternative embodiment of the invention can be in the form of a round steel tubing, as partially shown in cross-section in FIG. 11. The rocker 144 is formed into a curve that preferably has a constant radius or substantially constant radius. This rocker 144 serves the same function as the rocker 46 according to the preferred embodiment of the invention. The rocker 144 is attached to the seat frame 20. The rocker 144 can be secured to the support assembly 50, for example, by a plurality of rollers, one or more rollers 186 above the rocker 144 and one or more rollers 187 below. The tilt angle can be fixed by the alternative lock assembly 142, which can be located within the support assembly 198. The locking plates 146 have holes 192 through which the rocker 144 passes. These holes 192 are slightly oversized with respect to the diameter of the rocker 144. The plates 146 pivot about their upper ends. The spring 148 situated between the plates 146 forces the plates 146 to pivot away from one another and cam against the rocker 144 to lock the rocker 144 in place with respect to side tube 40 of the base 12. This secures the tilt angle of the seat frame 20. The plates 146 oppose one another so that, when the seat frame 20 is tilted in one direction, the trailing plate in the direction of travel of the rocker 144 cams against the rocker 144 and prevents the seat frame 20 from tilting. The cable 150 is preferably a lever-operated cable that is secured across the plates 146 so that, when the lever (not shown) is squeezed, the plates 146 pivot towards one another. As the plates 146 pivot toward one another, the axes of the holes 192 within the plates 146 align with the arc of the rocker 144 and release the rocker 144 to allow the rocker 144 to slide freely as the seat frame 20 tilts.

The invention described herein can be easily adapted to a battery-powered motor or actuator that could drive the tilt angle of the seating system. This adaptation could allow the tilt function of the vehicle to be operated by a control device that is accessible to either the attendant or the vehicle occupant. Likewise, the center of gravity seating system described herein could be mounted on a power base so that the wheels of the vehicle can be motor-driven.

The present invention is not intended to be limited to the embodiments shown and described above. The base and seat assembly illustrated and described above are merely provided for illustrative purposes. Other bases and seat frames can be suitable for carrying out the invention. The rockers are also provided for illustrative purposes. It should be understood that one or more tracks, other than the rockers shown and described, having radius curves with a center of curvature that is coincident or substantially coincident with the vehicle occupant's center of gravity may be suitable for carrying out the invention. The tracks can be supported by one of more rollers, slides, or other suitable low-friction members that allow the seat frame to rotate with respect to the base. Seat frame adjustments, including adjustments to the seat, the seat back, and the footrest assemblies, can be carried out in ways other than those set forth above. It should further be understood that the vehicle may or may not accommodate growth and further that growth accommodation may be carried out in a manner other than that described. It should also be appreciated that the seat frame and support assembly can be adjustable in a manner other than that described.

The present invention can achieve a truly stationary center of gravity during tilting. Minimal effort may be required on the part of the attendant or the vehicle occupant when tilting the seat assembly. No lifting or lowering of the occupant's center of gravity may be required to tilt the seat assembly. Because the tilting is preferably limited to pure rotation, the only effort required may be then regulated to overcome friction within the system.

The vehicle occupant should not experience a sensation of being pitched off balance during tilting. The sensation experienced during the center of gravity tilting should be more reassuring to the occupant and less likely to induce inadvertent reactions that could potentially injure the vehicle occupant.

The instant invention may also be advantageous in that the vehicle occupant's center of gravity may remain substantially stationary with respect to the base, thus increasing vehicle stability and allowing for a shorter base length. Having a shorter base frame increases the maneuverability of the vehicle and creates a smaller overall footprint for the vehicle, allowing it to fit within tighter confines.

Lastly, the present invention permits the weight distribution on the front and rear wheels of the vehicle to remain constant while tilting the seat frame 20. The well-defined weight distribution assists in controlling and steering of the vehicle.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A personal mobility vehicle comprising:

a base; and a seat moveable relative to the base along a curve having a focal point, the vehicle being adjustable to position the center of gravity of an occupant substantially coincident with the focal point of the curve, the center of gravity of the occupant remaining substantially coincident with the focal point as the seat is moved along the curve.

2. The vehicle according to claim 1, further being dimensioned and configured so that the center of gravity of the occupant remains substantially coincident with the focal point of the curve as the seat is moved relative to the base along the curve.

3. A personal mobility vehicle comprising:

a base; and a seat for supporting a vehicle occupant, the seat being supported for movement relative to the base along a curve having a center of curvature, the seat being adjustable to support a vehicle occupant having a center of gravity so that the center of gravity is positioned relative to the center of curvature sufficient to minimize effort required to move the seat with the vehicle occupant therein along the curve, the center of gravity of the occupant remaining substantially coincident with the center of curvature as the seat is moved along the curve.

4. The vehicle according to claim 3, further comprising at least one bearing for supporting the seat for movement relative to the base.

5. The vehicle according to claim 3, further comprising a lock for locking the seat to a substantially fixed position.

6. The vehicle according to claim 3, wherein the seat is adapted to move in fore and aft directions relative to the base.

7. The vehicle according to claim 3, wherein the vehicle occupant's center of gravity can be located within about one inch of the center of curvature.

8. The vehicle according to claim 3, wherein the vehicle occupant's center of gravity can be located within about two inches of the center of curvature.

9. The vehicle according to claim 3, wherein the seat has a fore to aft length and the vehicle occupant's center of gravity can be located at a point fore or aft of the center of curvature a distance equivalent to some percentage of the fore to aft length of the seat.

10. The vehicle according to claim 9, wherein the percentage is about four to about seven percent.

11. The vehicle according to claim 9, wherein the percentage is about 11 to about 16 percent.

12. The vehicle according to claim 3, further being dimensioned and configured so that the seat may be moved relative to the base along the curve without significantly moving the center of gravity of the occupant relative to the center of curvature.

13. A personal mobility vehicle comprising:

a base;

a plurality of wheels that are adapted to support the base relative to a supporting surface; and a seat for supporting an occupant, the seat being supported relative to the base for movement along an arcuate path with a substantially fixed center of rotation, the seat being adjustable such that the center of gravity of the occupant can be positioned substantially coincident with the center of rotation, the center of gravity of the occupant remaining substantially coincident with the center of curvature as the seat is moved along the curve.

14. The vehicle according to claim 13, wherein the seat is supported by one or more arcuate tracks serving as a rolling or sliding surface that allows the seat to rotate about said center of rotation with respect to the base.

15. The vehicle according to claim 14, further comprising a low friction support assembly supporting the seat relative to the base, the low friction support assembly being adjustable to change an overall range of seat tilt by fixing the low friction support assembly to the base at different angular orientations.

16. The vehicle according to claim 14, further comprising one or more protrusions that are adapted to be engaged with one or more recesses in the one or more tracks so that the protrusions enter the recesses to lock the tracks into an angular position and are adapted to be retracted from the recesses so that the seat can be rotated to a different tilt angle relative to the base.

17. The vehicle according to claim 14, wherein the one or more tracks comprise one or more curved members.

18. The vehicle according to claim 17, further comprising pivoting plates with holes therein situated about each of the one or more curved members, the holes being slightly larger than the diameter of the member so that the member can pass freely through the plates when the plates are pivoted so that axes of the holes are aligned with the arc of the member and so that the member is prevented from passing through the plates when the plates are pivoted so that the axes of the holes are not aligned with the arc of the member.

19. The vehicle according to claim 14, further comprising a low-friction support assembly comprising one or more rollers that support each of the one or more tracks so that the one or more tracks are free to rotate in a direction of rotation upon the one or more rollers but are otherwise constrained by the rollers from moving traverse to the direction of rotation.

20. The vehicle according to claim 19, wherein the one or more tracks and the corresponding one or more rollers each has at least a portion thereof that has a mating cross-sectional contour that prevents transverse movement of the rollers.

21. The vehicle according to claim 13, wherein the arcuate path is adjustable fore and aft with respect to the base and the front and rear wheels so that the position of the center of rotation relative to the front and rear wheels may be selectively changed.

22. The vehicle according to claim 13, wherein both the front and rear wheels are adjustable fore and aft relative to the center of rotation so that the distance between the front and rear wheels can be shortened or lengthened.

23. The vehicle according to claim 13, wherein the seat is an element of an adjustable seating system that allows the center of gravity of a vehicle occupant to be moved fore or aft in order to locate the center of gravity substantially close to the center of rotation of the constant radius arc.

24. The vehicle according to claim 23, wherein the adjustable seating system comprises a seat frame that, in addition to the seat, includes a backrest and a footrest assembly, all of which are adjustable fore and aft with respect to the center of rotation.

25. The vehicle according to claim 24, wherein the seat frame further comprises laterally spaced side members and the backrest comprises laterally spaced canes supported relative to the side frame by couplings, the couplings including an assembly of plates having upper ends operatively attached to one another and lower ends attached to the side members so that the lower ends of the plates can move relative to the side members while remaining operatively connected to the side members.

26. The vehicle according to claim 13, wherein the seat is an element of an adjustable seating system that allows the center of gravity of a vehicle occupant to be moved up or down in order to locate the center of gravity in substantial vertical alignment with the center of rotation of the constant radius arc when the seat is substantially horizontal.

27. The vehicle according to claim 13, further comprising a motor that is operatively connected between the base and the seat so that the seat can be rotated about the center of gravity of a vehicle occupant.

28. The vehicle according to claim 13, further comprising motors operatively connected to one or more of the plurality of wheels for driving the wheels operatively connected thereto.

29. The vehicle according to claim 13, wherein the vehicle is a wheelchair.

30. The vehicle according to claim 13, further being dimensioned and configured so that the center of gravity of the occupant remains substantially coincident with the center of rotation of the arcuate path as the seat is moved relative to the base along the arcuate path.

31. A personal mobility vehicle comprising:

a base;

a plurality of wheels that are adapted to support the base relative to a supporting surface;

a seat for supporting an occupant; and one or more tracks supporting the seat, the one or more tracks serving as a rolling or sliding surface that allows the seat to rotate with respect to the base, the one or more tracks having a constant or substantially constant radius arc with a focal point that is substantially fixed in space, whereby the vehicle is adjustable so that the location of the center of gravity of the occupant can be adjusted to be coincident or near coincident with the focal point, the center of gravity of the occupant remaining coincident or near coincident with the focal point as the seat is moved along the arc.

32. The vehicle according to claim 31, wherein near coincident is defined as a circular zone having about a four inch radius about the focal point and which lies in a plane that is substantially parallel to a plane defined by the tracks.

33. The vehicle according to claim 31, further being dimensioned and configured so that the center of gravity of the occupant remains coincident or near coincident with the focal point of the curve as the seat is rotated with respect to the base.

34. The vehicle according to claim 31, wherein near coincident is defined as a circular zone having about a two inch radius about the focal point and which lies in a plane that is substantially parallel to a plane defined by the tracks.

* * * * *